US012139186B2

United States Patent
Luo

(10) Patent No.: US 12,139,186 B2
(45) Date of Patent: Nov. 12, 2024

(54) BABY WALKER

(71) Applicant: Lifang Luo, Ganzhou (CN)

(72) Inventor: Lifang Luo, Ganzhou (CN)

( * ) Notice: Subject to any disclaimer, the term of this patent is extended or adjusted under 35 U.S.C. 154(b) by 0 days.

(21) Appl. No.: 18/618,154

(22) Filed: Mar. 27, 2024

(65) Prior Publication Data

US 2024/0227905 A1     Jul. 11, 2024

(30) Foreign Application Priority Data

Mar. 12, 2024    (CN) .......................... 202420469965.4

(51) Int. Cl.
    *B62B 7/04*       (2006.01)
    *B62B 7/00*       (2006.01)

(52) U.S. Cl.
    CPC ............... *B62B 7/04* (2013.01); *B62B 7/004* (2013.01)

(58) Field of Classification Search
CPC .......... B62B 7/04; B62B 7/004; B62B 5/049; B62B 9/108; B62B 9/102; B62B 5/0013; B62B 9/14; B62B 9/147; B62B 9/145; B62B 9/142; A47D 9/012; A47D 13/025; A47D 15/006
See application file for complete search history.

(56) References Cited

U.S. PATENT DOCUMENTS

| | | | | |
|---|---|---|---|---|
| 4,503,943 A | * | 3/1985 | Tsukui ................ | B60B 33/0042 16/34 |
| 4,773,639 A | * | 9/1988 | Graves ................. | A47D 13/043 482/66 |
| 5,083,806 A | * | 1/1992 | Brown ................. | A47D 13/043 280/87.051 |
| 5,727,800 A | * | 3/1998 | Liu ...................... | A47D 13/043 280/87.051 |

(Continued)

FOREIGN PATENT DOCUMENTS

| | | | |
|---|---|---|---|
| CN | 204950251 U | * | 1/2016 |
| CN | 105946951 A | * | 9/2016 |

(Continued)

OTHER PUBLICATIONS

Translated CN-114052438-A (Year: 2024).*
Translated CN-116654074-A (Year: 2024).*
Translated CN-217396608-U (Year: 2024).*

*Primary Examiner* — James A Shriver, II
*Assistant Examiner* — Ian Bryce Shelton
(74) *Attorney, Agent, or Firm* — Hemisphere Law, PLLC; Zhigang Ma

(57) ABSTRACT

A baby walker includes an upper housing, a seat cushion, wheel assemblies, a lower housing and telescopic devices. The seat cushion is connected to the upper housing. The wheel assemblies are connected to the lower housing. One end of each telescopic device is connected to the upper housing, and the other end of the telescopic device is (Continued)

connected to the lower housing. A length of the telescopic device can be adjusted telescopically between a contracted state and an extended state. The telescopic device is configured to adjust a distance between the upper housing and the lower housing, so that a user can adjust the distance between the upper housing and the lower housing to adjust the height of the baby walker, and the baby walker can be used by babies with different heights, making the baby walker suitable for the entire growth process of the babies.

17 Claims, 19 Drawing Sheets

(56) References Cited

U.S. PATENT DOCUMENTS

| | | | | |
|---|---|---|---|---|
| 7,025,364 | B1* | 4/2006 | Clarke | B62B 9/26 |
| | | | | 280/87.051 |
| 8,162,333 | B1* | 4/2012 | Bartlett | A47D 13/043 |
| | | | | 280/87.051 |
| 8,783,765 | B1* | 7/2014 | Matus | A47D 1/10 |
| | | | | 4/578.1 |
| 8,851,487 | B2* | 10/2014 | Maxie | B62B 9/24 |
| | | | | 280/87.051 |
| 10,342,361 | B2* | 7/2019 | Cotirla | A63H 33/006 |
| 10,407,089 | B1* | 9/2019 | Matranga | A47D 13/043 |
| 10,835,054 | B2* | 11/2020 | Cotirla | A47D 13/107 |
| 2004/0075231 | A1* | 4/2004 | Hou | A47D 13/043 |
| | | | | 280/87.051 |
| 2005/0140185 | A1* | 6/2005 | McClintock | A63H 33/006 |
| | | | | 297/136 |
| 2005/0146106 | A1* | 7/2005 | Myers | A47D 13/101 |
| | | | | 280/87.051 |
| 2006/0237932 | A1 | 10/2006 | Moore | |
| 2010/0078909 | A1* | 4/2010 | Cheng | A47D 13/043 |
| | | | | 280/87.051 |
| 2013/0319884 | A1* | 12/2013 | Gomez | A47D 1/0081 |
| | | | | 248/274.1 |
| 2014/0252737 | A1* | 9/2014 | Maxie | B62B 9/24 |
| | | | | 224/159 |
| 2016/0046315 | A1 | 2/2016 | Zehfuss et al. | |
| 2017/0183024 | A1 | 6/2017 | Liao | |
| 2018/0317668 | A1* | 11/2018 | Cotirla | A47D 11/002 |
| 2019/0281994 | A1* | 9/2019 | Cotirla | A47D 1/02 |
| 2020/0163467 | A1* | 5/2020 | Baharmand | F16D 63/006 |
| 2021/0283002 | A1* | 9/2021 | Keene | A47D 13/043 |
| 2023/0159072 | A1* | 5/2023 | Bernal | B66F 7/0625 |
| | | | | 280/638 |

FOREIGN PATENT DOCUMENTS

| | | | | |
|---|---|---|---|---|
| CN | 109436074 | A | * 3/2019 | B62B 7/06 |
| CN | 110051167 | A | * 7/2019 | |
| CN | 110626415 | A | * 12/2019 | |
| CN | 210526627 | U | * 5/2020 | |
| CN | 114052438 | A | * 2/2022 | |
| CN | 211543661 | U | * 9/2022 | |
| CN | 217396608 | U | * 9/2022 | |
| CN | 217969633 | U | * 12/2022 | |
| CN | 115593494 | A | * 1/2023 | |
| CN | 116654074 | A | * 8/2023 | |
| KR | 20090003418 | U | * 4/2009 | |

* cited by examiner

BABY WALKER

CROSS-REFERENCE TO RELATED APPLICATIONS

The application claims priority of Chinese patent application CN2024204699654, filed on Mar. 12, 2024, which is incorporated herein by reference in its entireties.

TECHNICAL FIELD

The present disclosure relates to the field of baby walkers, and in particular, to a baby walker.

BACKGROUND

Most of existing baby walkers on the market have a fixed height, which difficultly meets usage requirements of babies of different heights. As babies grow, their heights also constantly change, making it difficult for the existing baby walkers with the fixed heights to adapt to the entire growth period of the babies, greatly affecting the user experience.

SUMMARY

In order to overcome the shortcomings of the prior art, the present disclosure provides a baby walker.

The baby walker includes an upper housing;
a seat cushion, wherein the seat cushion is connected to the upper housing;
a wheel assembly;
a lower housing, wherein the wheel assembly is connected to the lower housing; and
a telescopic device, wherein one end of the telescopic device is connected to the upper housing, and the other end of the telescopic device is connected to the lower housing; a length of the telescopic device is adjusted telescopically between a contracted state and an extended state; and the telescopic device is configured to adjust a distance between the upper housing and the lower housing.

As the improvement of the present disclosure, the telescopic device includes a telescopic assembly and a first connecting rod; one end of the telescopic assembly is connected to the lower housing, and the other end of the telescopic assembly is connected to one end of the first connecting rod; and the other end of the first connecting rod is connected to the upper housing.

As the improvement of the present disclosure, the telescopic assembly includes a telescopic rod, a telescopic sleeve, and a first locking spring buckle; the telescopic sleeve is provided with a first opening; the telescopic rod is plugged into the telescopic sleeve through the first opening; the telescopic rod slides in the telescopic sleeve; a side wall of the telescopic sleeve is provided with several first adjustment holes; the first locking spring buckle is connected to the telescopic rod; and when the first locking spring buckle slides along with the telescopic rod to the first adjustment hole, the first locking spring buckle extends out via the first adjustment hole to lock the telescopic rod to the telescopic sleeve, so as to fix the length of the telescopic device.

As the improvement of the present disclosure, the first locking spring buckle includes a first spring buckle head, a first spring, a first mounting bracket, a pull wire, and a push member; the first mounting bracket is connected to the telescopic rod; the first spring buckle head is connected to the first mounting bracket; one end of the first spring resists against the first spring buckle head, and the other end of the first spring resists against the first mounting bracket; the push member is connected to the telescopic rod; the telescopic rod is provided with a first sliding chute; the push member slides in the first sliding chute; one end of the pull wire is connected to the first spring buckle head, and the other end of the pull wire is connected to the push member; the push member includes a second mounting bracket and a first push button; one end of the pull wire is connected to the first spring buckle head, and the other end of the pull wire is connected to the second mounting bracket; the second mounting bracket is located in the telescopic rod; the second mounting bracket is provided with a first insertion port; the first push button is provided with an insertion block; on an outer surface of the telescopic rod, the insertion block is inserted into the first insertion port through the first sliding chute, so that the first push button slides on the first sliding chute and drives the second mounting bracket, the pull wire, and the first spring buckle head to move; when the first push button slides to a first position on the first sliding chute under the action of an external force, the first push button drives, through the second mounting bracket and the pull wire, the first spring buckle head to contract until the first spring buckle head is separated from the first adjustment hole, and the first spring is compressed; the telescopic rod slides in the telescopic sleeve; when the first push button is not subjected to an external force, an elastic reset force generated when the first spring is compressed pushes the first spring, the second mounting bracket, and the first push button to be reset to a second position; and when the first spring buckle head slides with the telescopic rod to the first adjustment hole, the first spring pushes the first spring buckle head to extend out via the first adjustment hole to lock the telescopic rod to the telescopic sleeve, so as to fix the length of the telescopic device.

As the improvement of the present disclosure, the first connecting rod is rotatably connected to the upper housing; the telescopic assembly is rotatably connected to the lower housing; and the telescopic assembly is rotatably connected to the first connecting rod, so that the telescopic assembly and the first connecting rod rotate with each other to an unfolded position or a folded position.

As the improvement of the present disclosure, the baby walker further includes a first locking device, wherein the first locking device is connected to the first connecting rod or the telescopic assembly; when the telescopic assembly and the first connecting rod rotate with each other to the unfolded position, the first locking device locks the telescopic assembly to the first connecting rod, so that the telescopic assembly and the first connecting rod do not rotate with each other; and when the first locking device releases the locking between the telescopic assembly and the first connecting rod, the telescopic assembly and the first connecting rod rotate with each other to the folded position.

As the improvement of the present disclosure, the first locking device includes a first latch, a second spring, and a second insertion port arranged on the first connecting rod; a second sliding chute is arranged on the telescopic assembly; one end of the second spring is connected to the telescopic assembly, and the other end of the second spring is connected to the first latch; the first latch slides on the second sliding chute; when the telescopic assembly and the first connecting rod rotate with each other to the unfolded position, the second spring pushes the first latch to slide on the second sliding chute and into the second insertion port, so as to lock the telescopic assembly to the first connecting rod, so that the telescopic assembly and the first connecting rod do not rotate with each other; the first latch is arranged in the telescopic assembly; the first locking device further includes a second push button; and on an outer surface of the telescopic assembly, the second push button is connected to the first latch through the second sliding chute.

As the improvement of the present disclosure, the lower housing is provided with a second opening; and when the telescopic device is in the contracted state and the telescopic assembly and the first connecting rod rotate with each other to the folded position, a length of the telescopic assembly and a length of the first connecting rod are both less than an opening diameter of the second opening, and a length of the upper housing and a width of the upper housing are both less than the opening diameter of the second opening, so that the telescopic device and the upper housing are folded from bottom to top in sequence and stored into the second opening.

As the improvement of the present disclosure, the seat cushion is detachably connected to the upper housing.

As the improvement of the present disclosure, the baby walker further includes a second locking device, wherein one end of the seat cushion is detachably connected to the upper housing, and the other end of the seat cushion is provided with several second adjustment holes arranged in a longitudinal direction of the seat cushion; the second adjustment holes are configured to adjust a length of the seat cushion; the second locking device is inserted into one of the several second adjustment holes; and the second locking device is detachably connected to the upper housing.

As the improvement of the present disclosure, the second locking device includes a second latch, a second locking spring buckle, and a third insertion port arranged on the upper housing; one end of the second latch is provided with a first stop edge, and the other end of the second latch is provided with a fourth insertion port; the other end of the second latch is inserted into the third insertion port and the second adjustment hole; the second locking spring buckle is detachably connected to the fourth insertion port; and the first stop edge and the second locking spring buckle stop and lock the second latch in the third insertion port, so as to lock the other end of the seat cushion to the upper housing.

As the improvement of the present disclosure, the second locking spring buckle includes a first main body and a second main body; the first main body is provided with a first end and a second end; a mounting opening is formed between the first end and the second end; one end of the second main body is rotatably connected to the first end of the first main body; a torsion spring is arranged on the first main body or the second main body; and the torsion spring is configured to push the other end of the second main body to compress the second end of the first main body, so as to close the mounting opening.

As the improvement of the present disclosure, the baby walker further includes a braking assembly and a third locking device, wherein the braking assembly is rotatably connected to the lower housing; the third locking device is connected to the braking assembly to lock the braking assembly to the lower housing; and when the third locking device unlocks the braking assembly, the braking assembly rotates relative to the lower housing to allow the braking assembly to rotate between an initial position and a braking position.

As the improvement of the present disclosure, the braking assembly includes a brake rod, a third mounting bracket, and a rotating shaft; the third mounting bracket is connected to the lower housing; the brake rod is rotatably connected to the third mounting bracket through the rotating shaft, so that the brake rod rotates between the initial position and the braking position; the third locking device includes a locking housing and a third spring; the locking housing is provided with a third sliding chute; the rotating shaft slides on the third sliding chute; the locking housing sleeves the brake rod; one end of the third spring resists against an inner wall of the third sliding chute, and the other end of the third spring resists against the rotating shaft; the locking housing is provided with a second stop edge; when the locking housing rotates with the brake rod to the initial position, the third spring pushes the second stop edge to be locked to the third mounting bracket; the third mounting bracket is further provided with a fifth insertion port; when the locking housing rotates with the brake rod to the braking position, the third spring pushes the locking housing to be locked in the fifth insertion port; the baby walker further includes a flexible brake pad; the brake pad is detachably connected to the brake rod; and a surface of the brake pad is provided with several antiskid lines.

As the improvement of the present disclosure, the baby walker further includes a handle, wherein the handle is detachably connected to the upper housing. The handle is detachably connected to the upper housing. The handle further includes a third locking spring buckle. The upper housing is provided with a sixth insertion port. A side wall of the sixth insertion port is provided with a locking hole position. When the handle is inserted into the sixth insertion port, the third locking spring buckle extends out of the locking hole position to lock the handle to the upper housing. The third locking spring buckle includes a fourth spring and a second spring buckle head. One end of the fourth spring is connected to the handle, and the other end of the fourth spring is connected to the second spring buckle head. When the handle is inserted into the sixth insertion port, the fourth spring pushes the second spring buckle head to extend out of the locking hole position to lock the handle to the upper housing.

As the improvement of the present disclosure, the baby stroller walker further includes a sunshade, wherein the sunshade includes a second connecting rod and a shading plate; one end of the second connecting rod is detachably connected to the handle, and the other end of the second connecting rod is provided with a universal ball head; the shading plate is provided with a universal ball groove; the universal ball head is connected to the universal ball groove; and the universal ball head rotates in the universal ball groove, so that the shading plate and the second connecting rod rotate relatively.

As the improvement of the present disclosure, the baby walker further includes a music box, wherein the music box is detachably connected to the upper housing.

As the improvement of the present disclosure, the baby walker further includes a knob, wherein the knob is rotatably connected to the upper housing; the knob is provided with a clamping block; the upper housing is provided with a music box mounting slot; the music box is provided with a clamping slot; and when the music box is mounted in the music box mounting slot, the clamping block rotates with the knob into the clamping slot, so as to stop and lock the music box in the music box mounting slot.

As the improvement of the present disclosure, the baby walker further includes a foot mat, wherein the foot mat is detachably connected to the lower housing.

As the improvement of the present disclosure, the foot mat includes a flexible mat body and a flexible strap; one end of the strap is connected to the foot mat, and one end of the strap is provided with a first clamping portion; the other end of the strap is provided with a first clamping fitting portion; the lower housing is provided with a fifth insertion port; and the first clamping fitting portion is detachably connected to the first clamping portion through the fifth insertion port to connect the mat body to the lower housing.

The present disclosure has the following beneficial effects. The present disclosure provides a baby walker. The baby walker includes an upper housing; a seat cushion, wherein the seat cushion is connected to the upper housing; wheel assemblies; a lower housing, wherein the wheel assemblies are connected to the lower housing; and telescopic devices, wherein one end of each telescopic device is connected to the upper housing, and the other end of the telescopic device is connected to the lower housing; a length of the telescopic device can be adjusted telescopically between a contracted state and an extended state; and the telescopic device is configured to adjust a distance between the upper housing and the lower housing, so that a user can adjust the distance between the upper housing and the lower housing to adjust the height of the baby walker, and the baby walker can be used by babies with different heights, making the baby walker suitable for the entire growth process of the babies.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
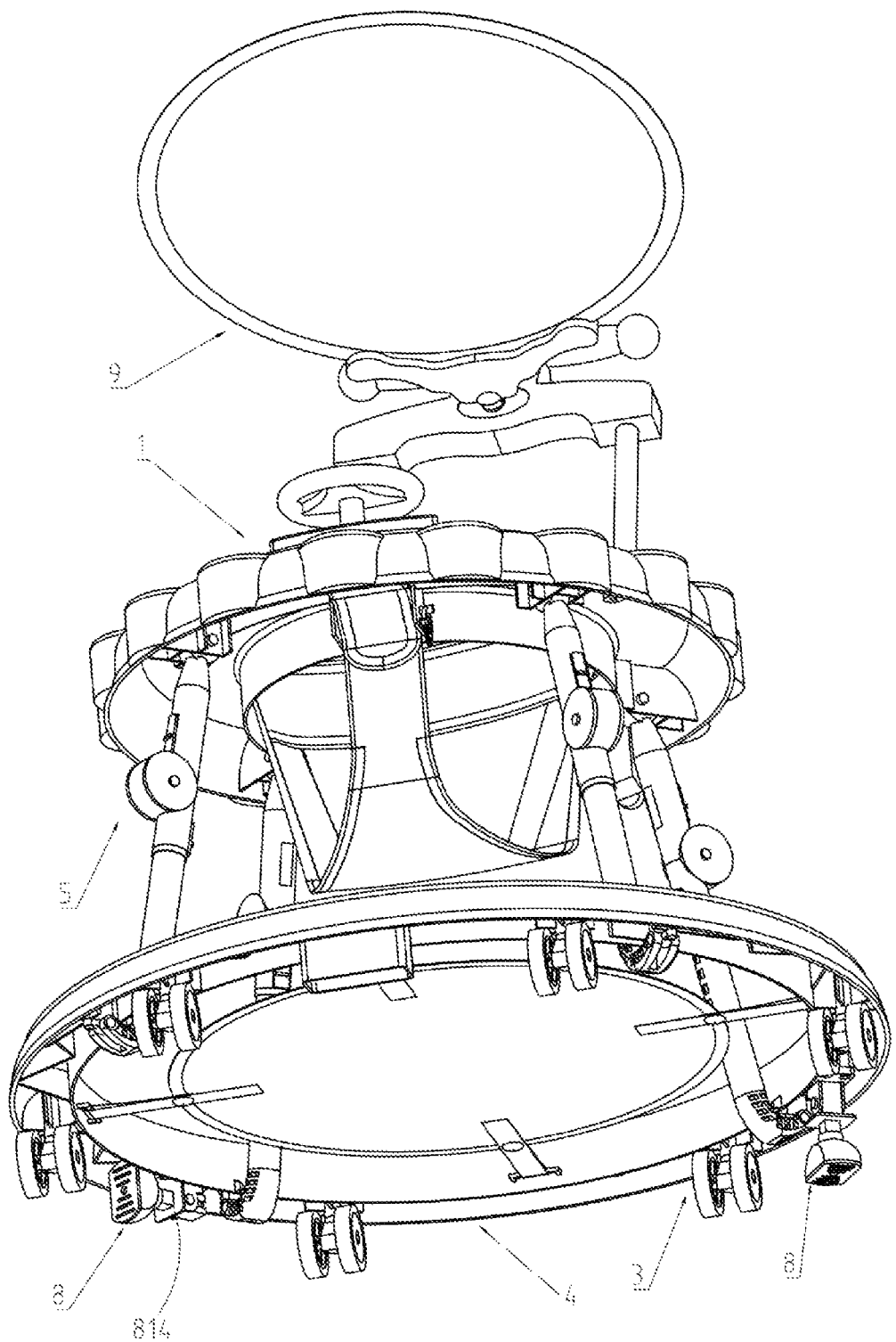
FIG. 1 is a schematic diagram of an entire structure of the present disclosure.
Figure 2:
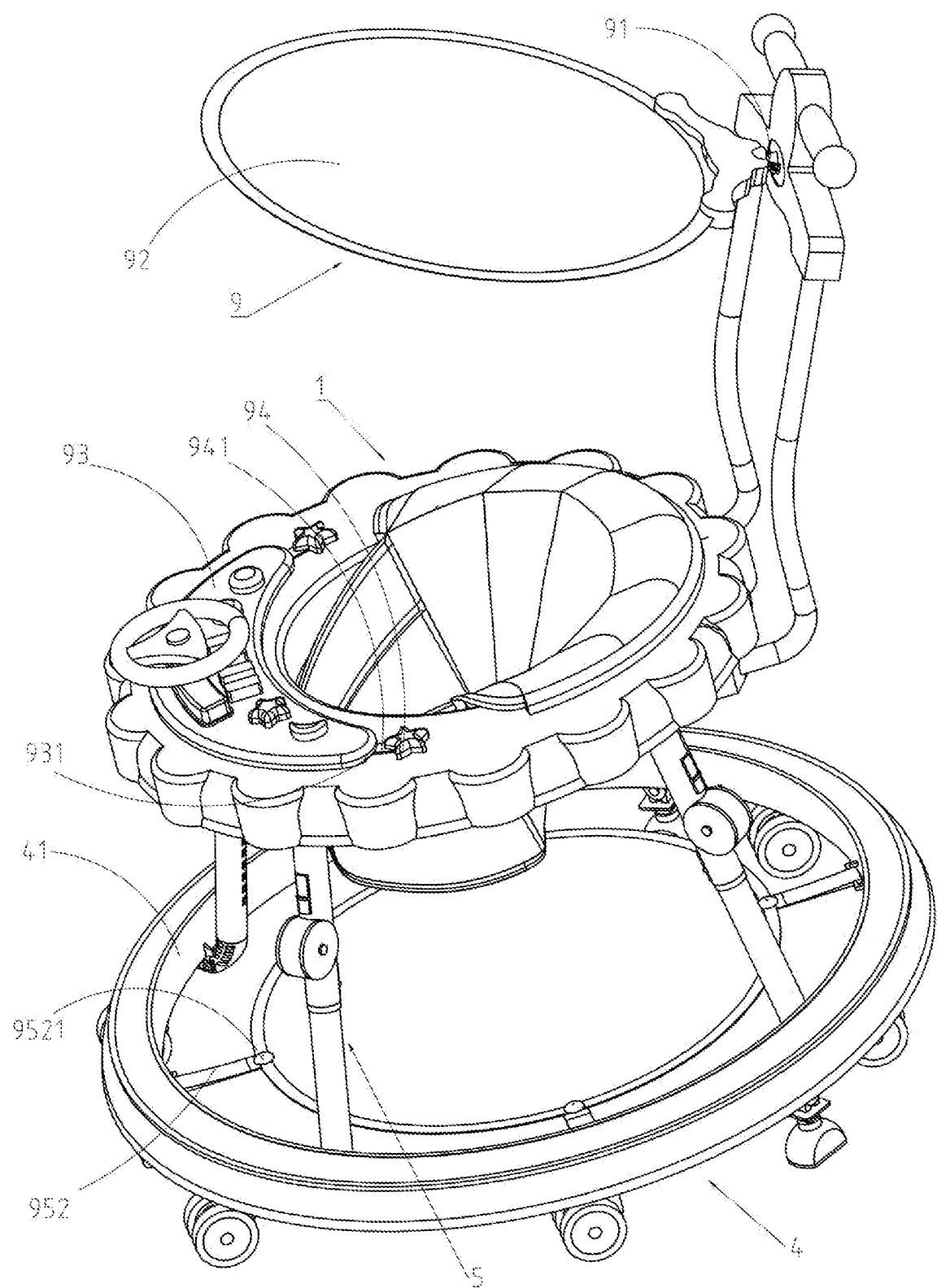
FIG. 2 is a schematic diagram of another entire structure of the present disclosure.
Figure 3:
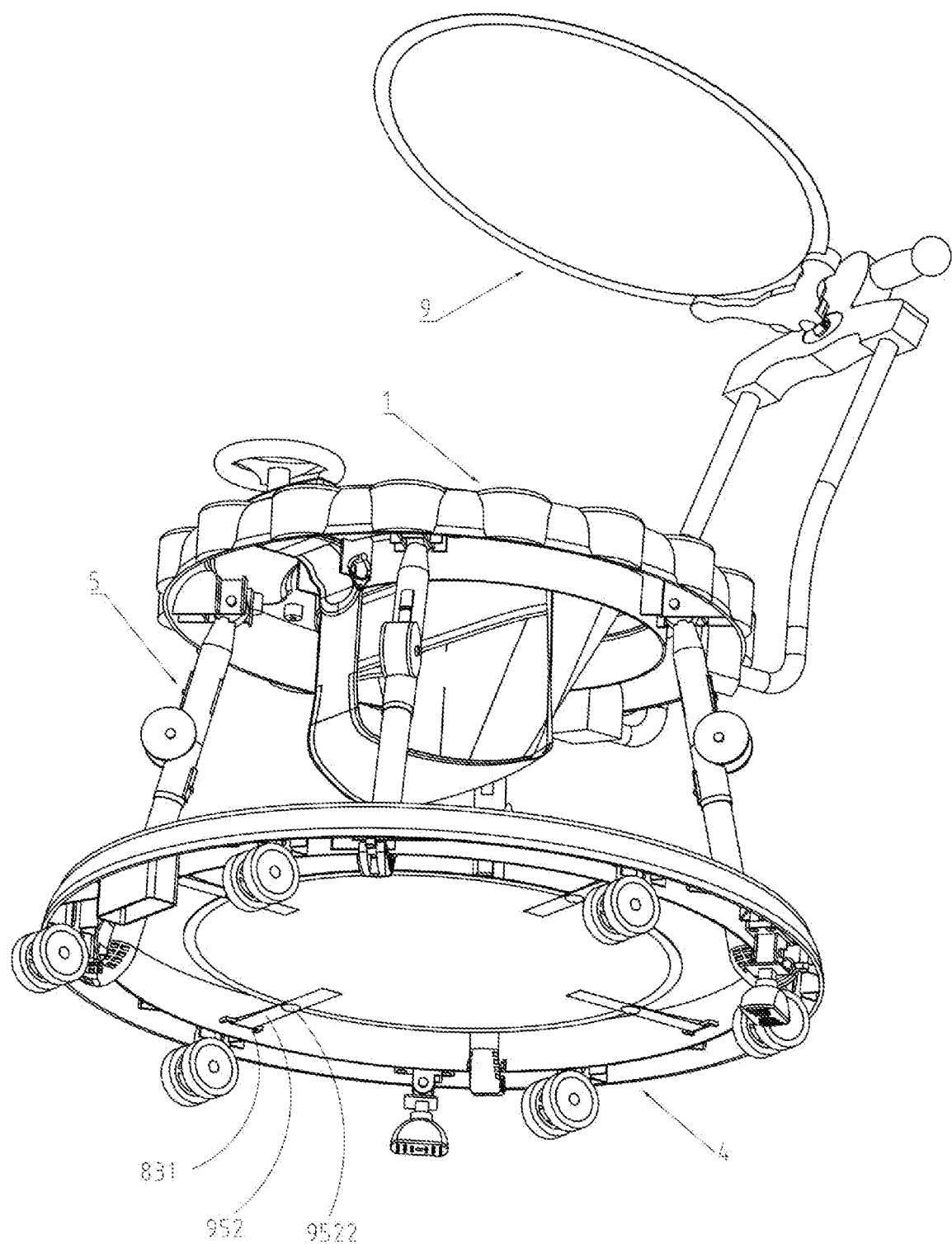
FIG. 3 is a schematic diagram of another entire structure of the present disclosure.
Figure 4:
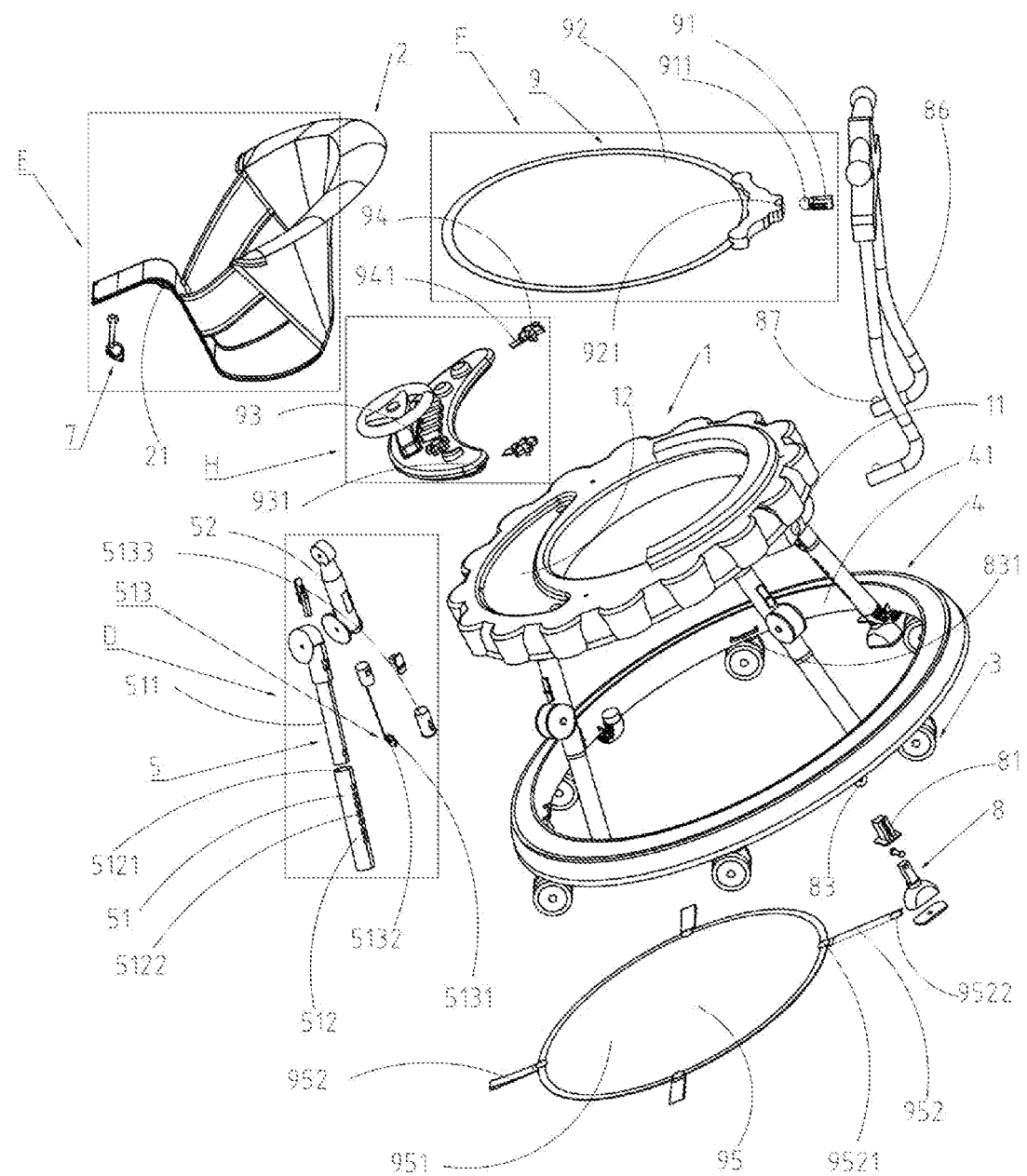
FIG. 4 is an exploded view of the present disclosure.
Figure 5:
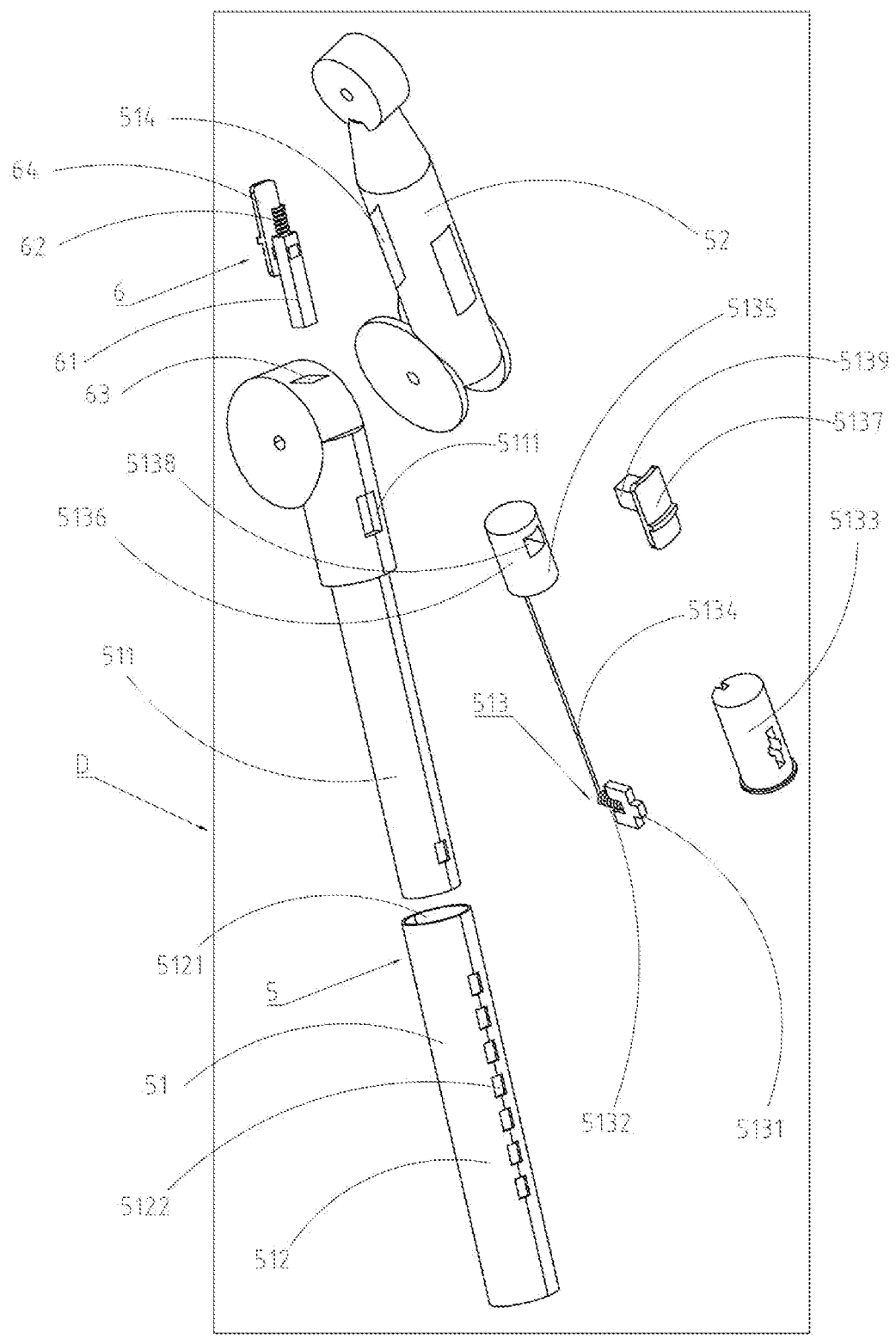
FIG. 5 is an enlarged view of the part D in FIG. 4.
Figure 6:
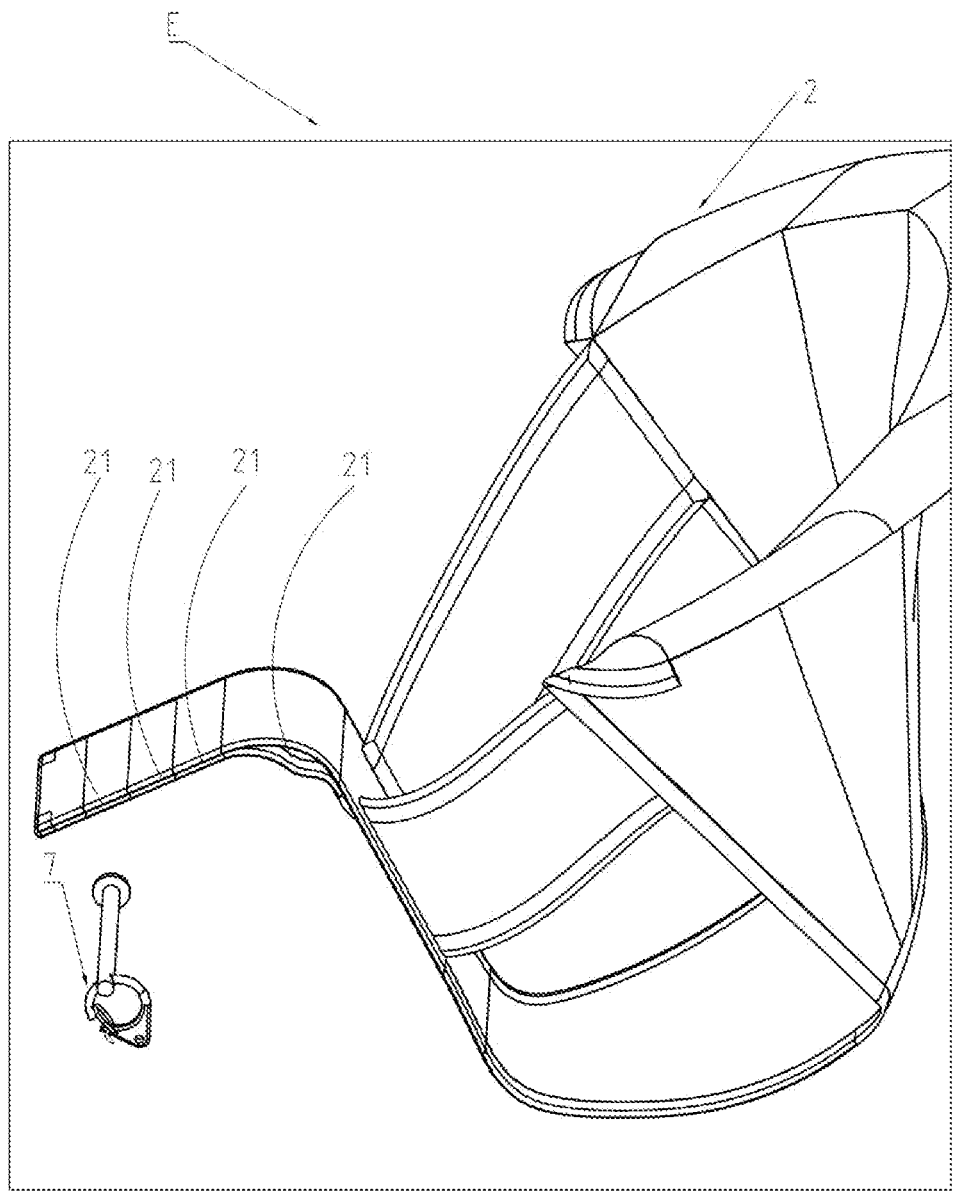
FIG. 6 is an enlarged view of the part E in FIG. 4.
Figure 7:
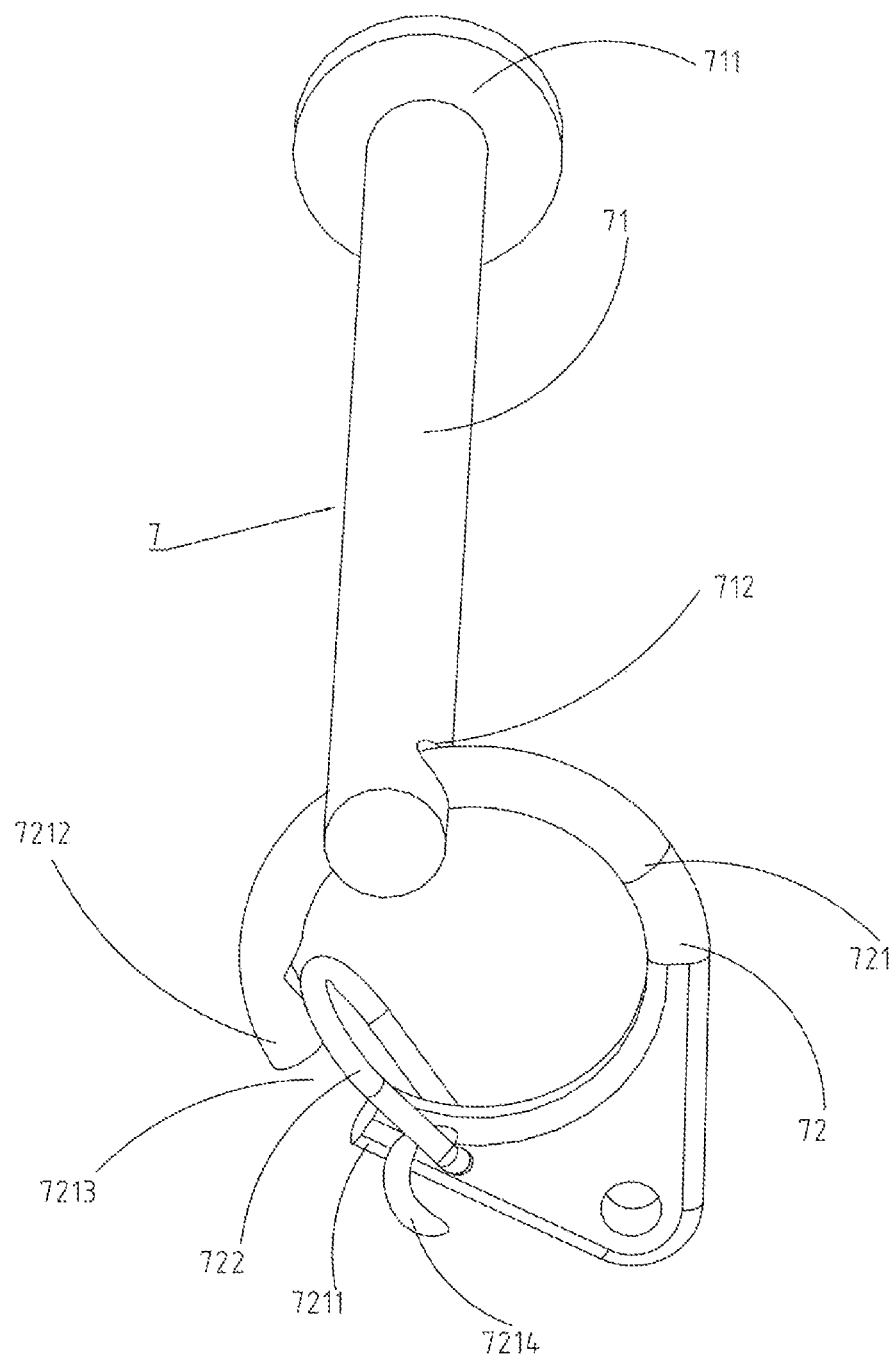
FIG. 7 is a schematic structural diagram of a second locking device.
Figure 8:
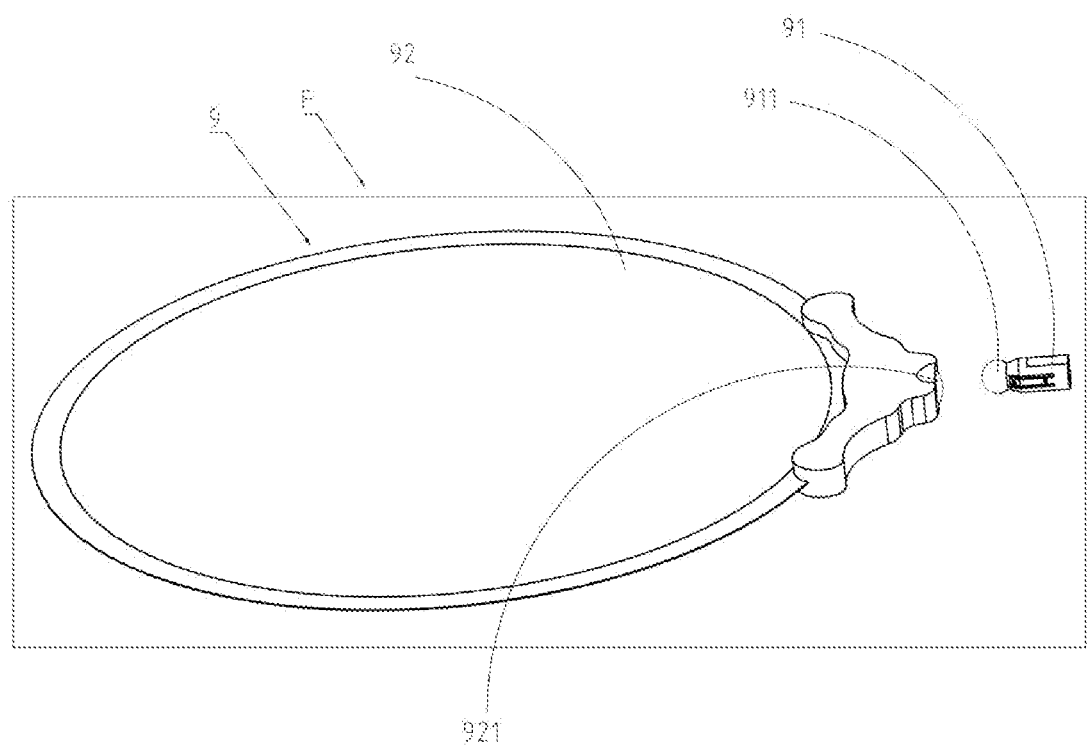
FIG. 8 is an enlarged view of the part F in FIG. 4.
Figure 9:
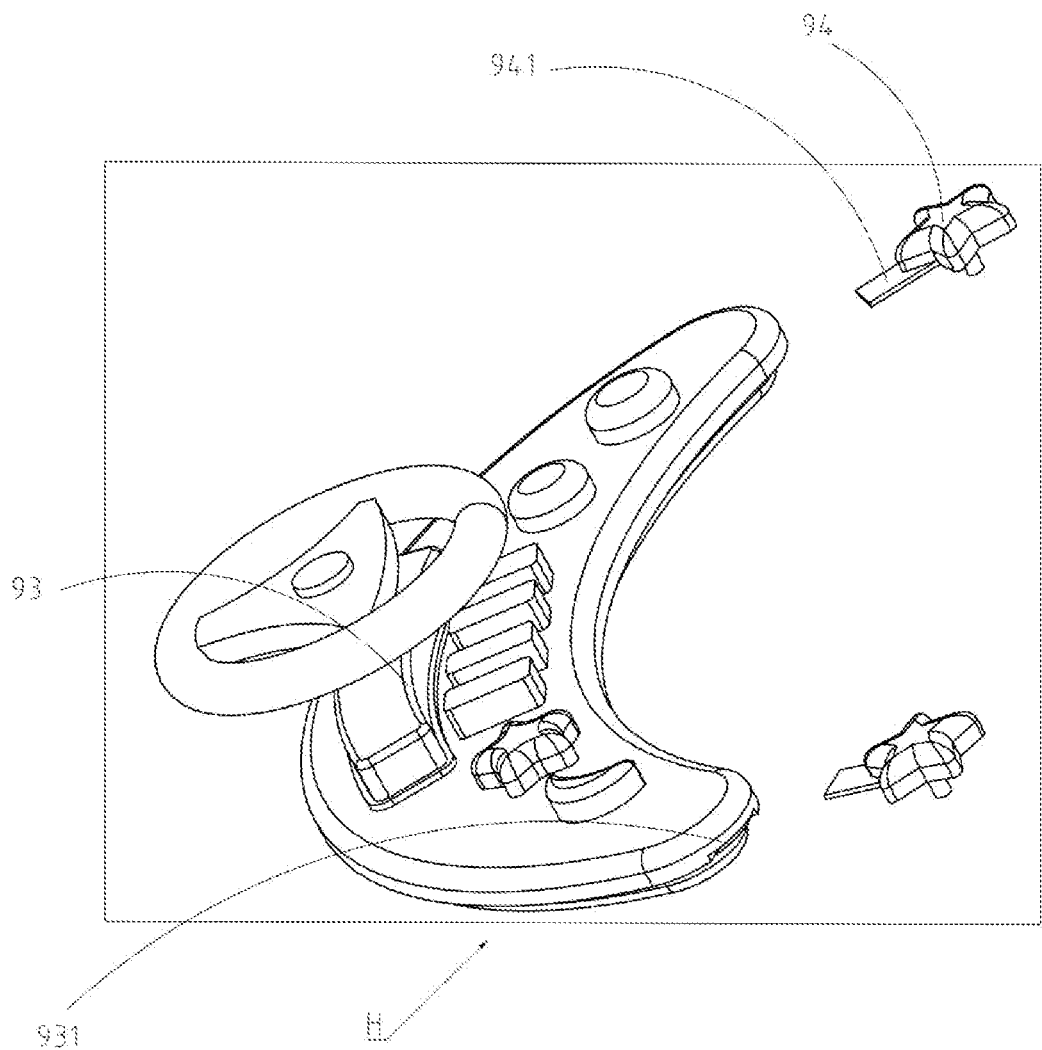
FIG. 9 is an enlarged view of the part H in FIG. 4.
Figure 10:
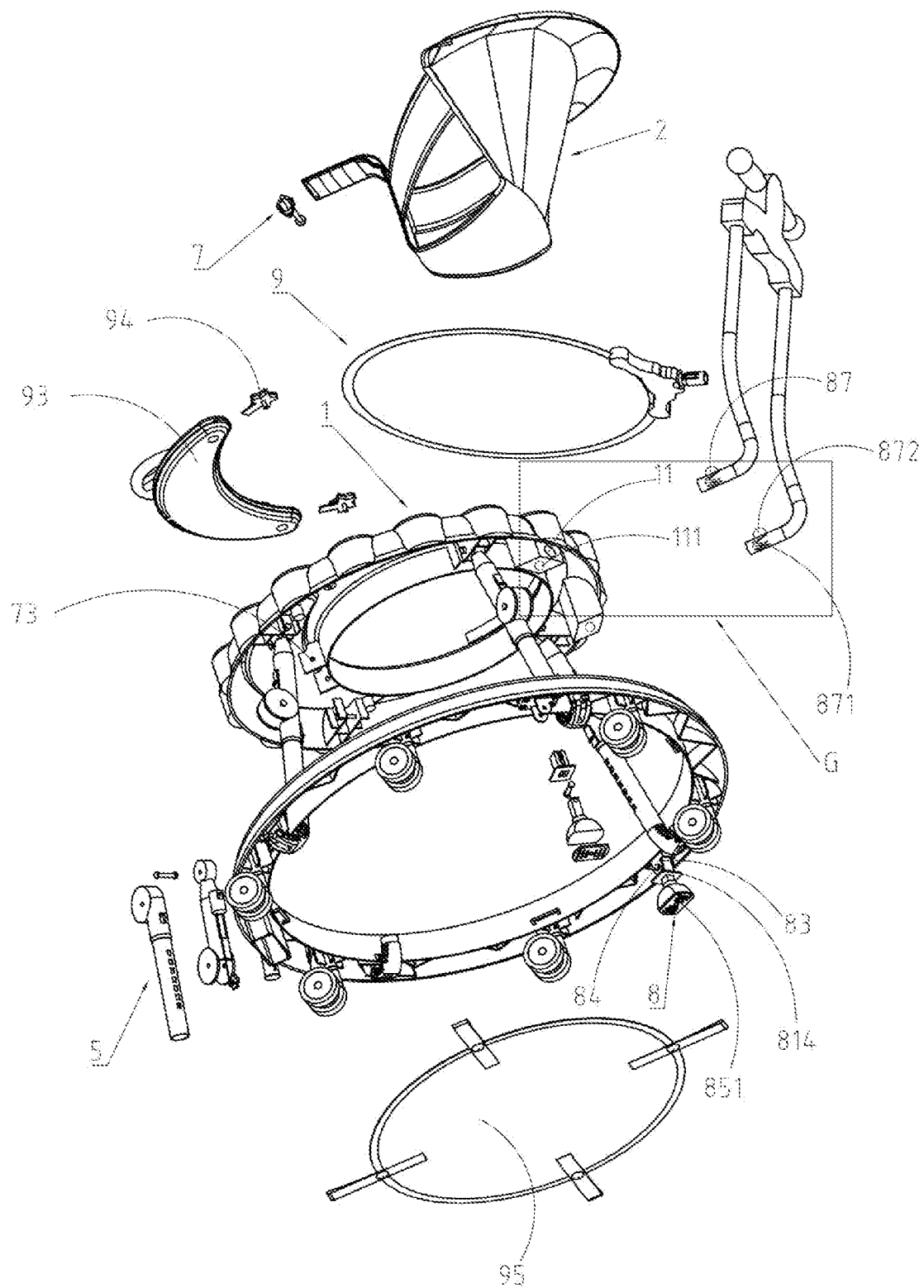
FIG. 10 is another exploded view of the present disclosure.
Figure 11:
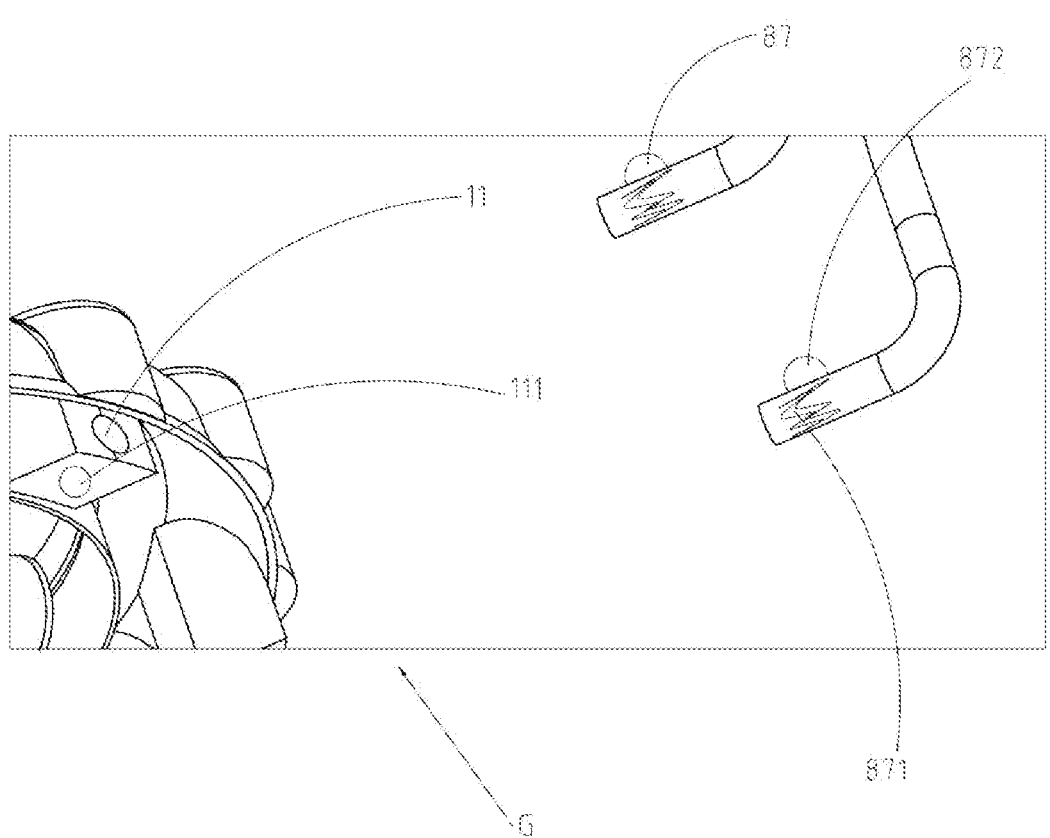
FIG. 11 is an enlarged view of the part G in FIG. 10.
Figure 12:
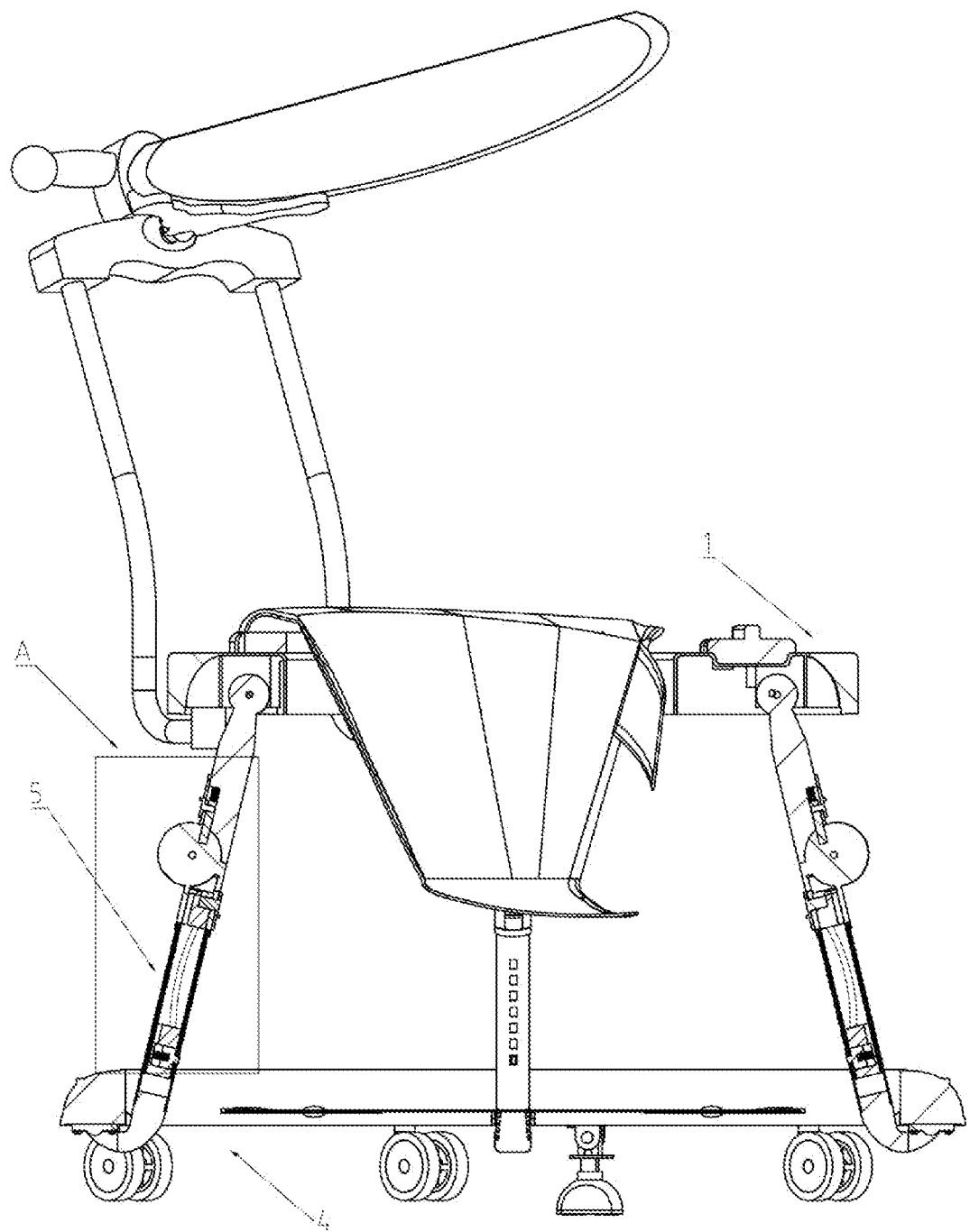
FIG. 12 is a sectional view cut away along a telescopic device.
Figure 13:
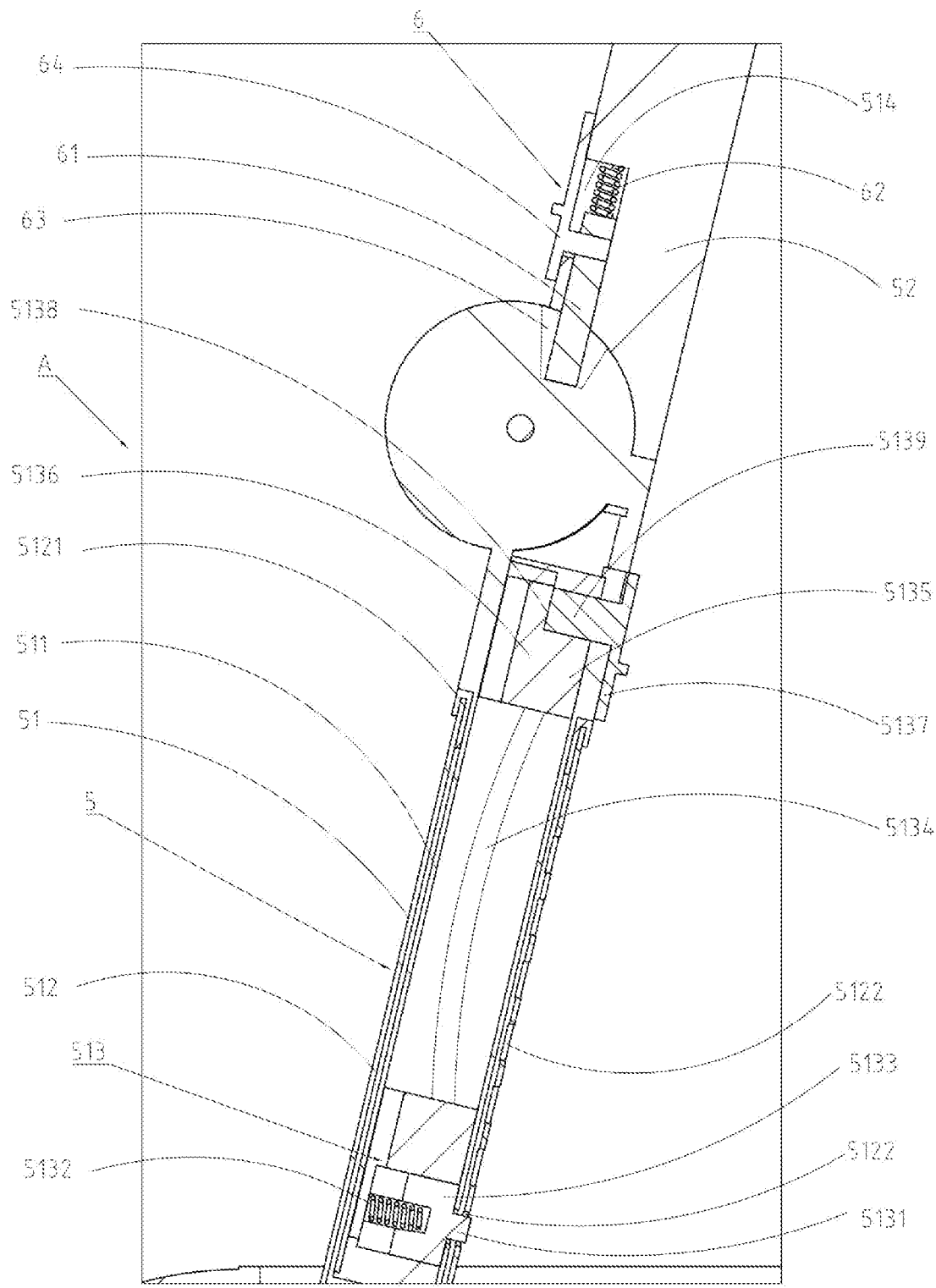
FIG. 13 is an enlarged view of the part A in FIG. 12.
Figure 14:
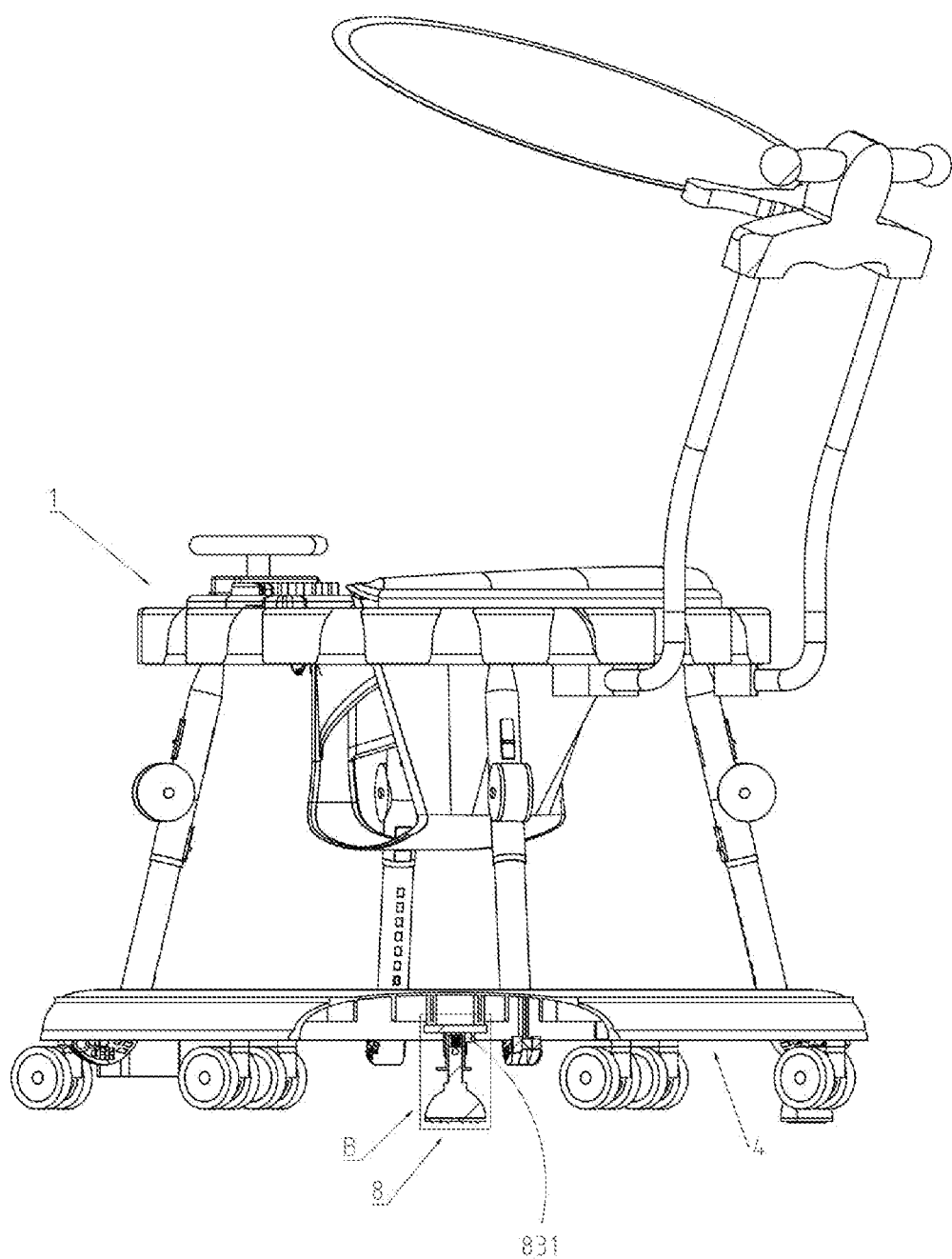
FIG. 14 is a sectional view cut away along a braking assembly.
Figure 15:
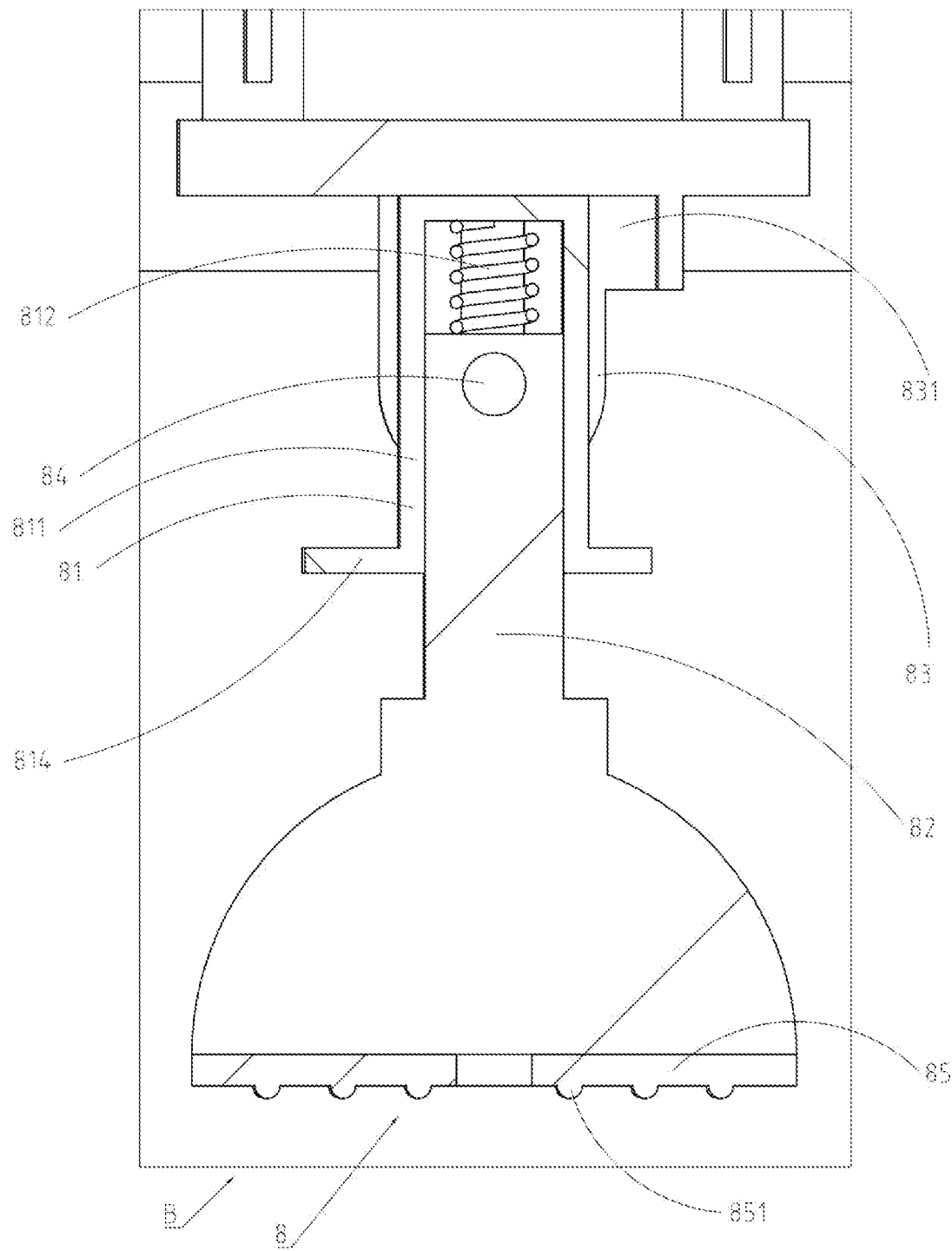
FIG. 15 is an enlarged view of the part B in FIG. 14.
Figure 16:
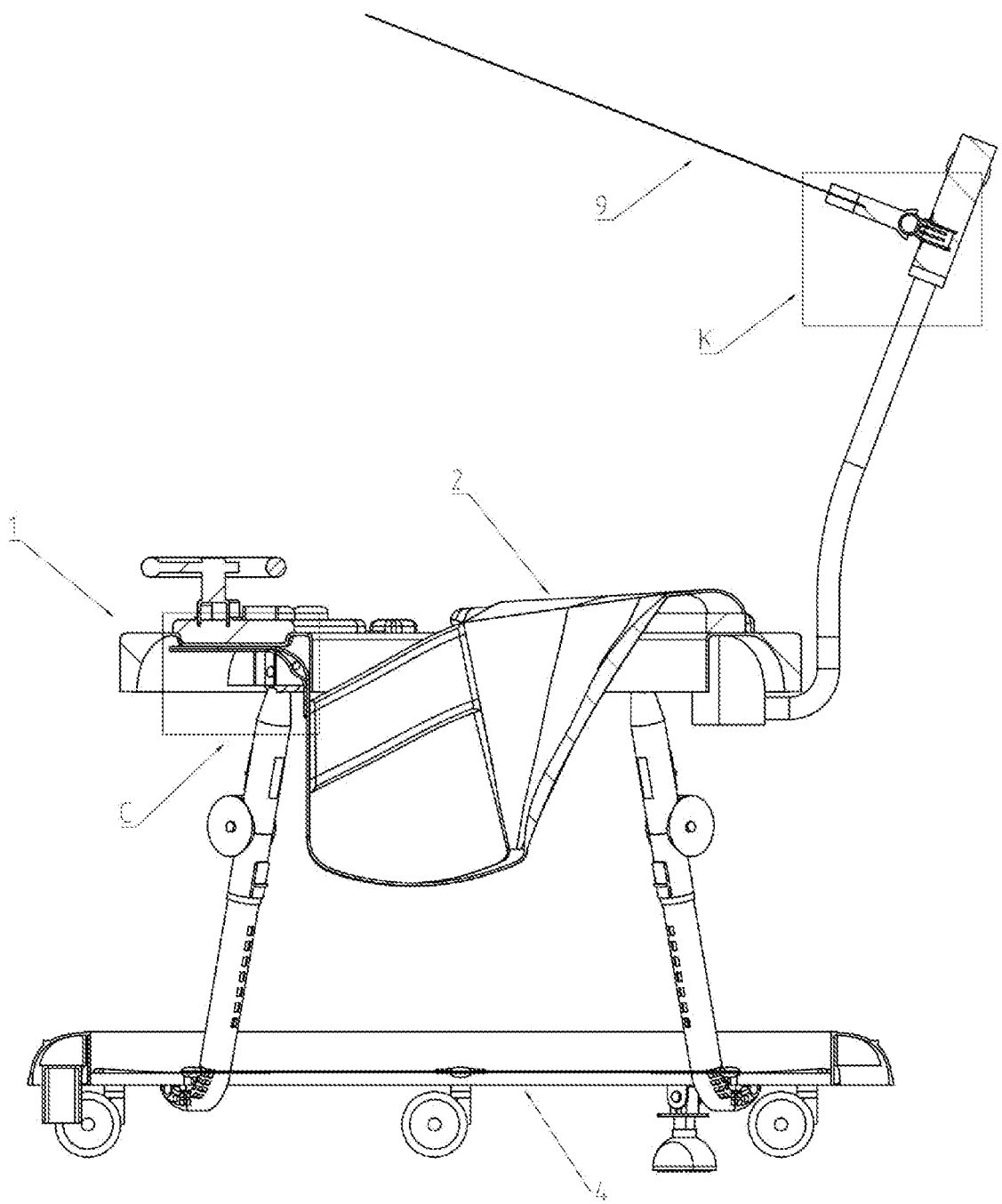
FIG. 16 is a sectional view cut away along a seat cushion.
Figure 17:
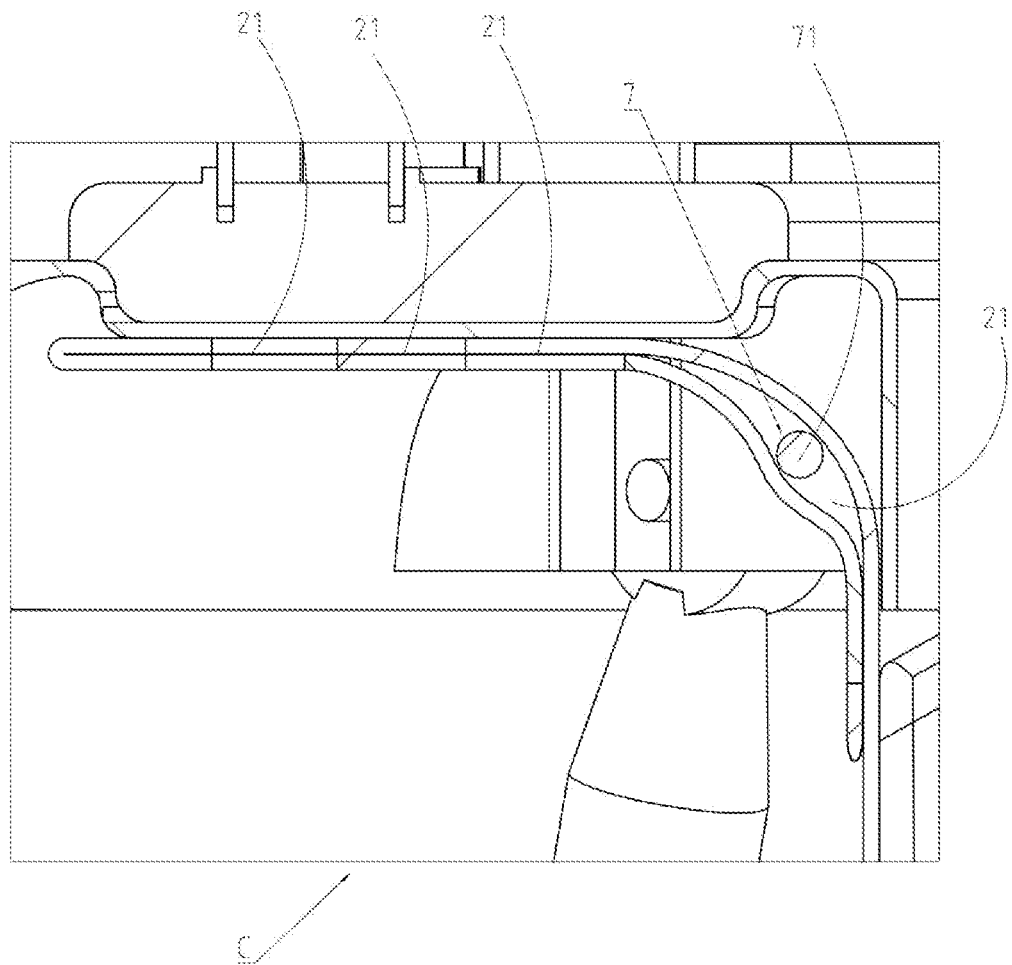
FIG. 17 is an enlarged view of the part C in FIG. 16.
Figure 18:
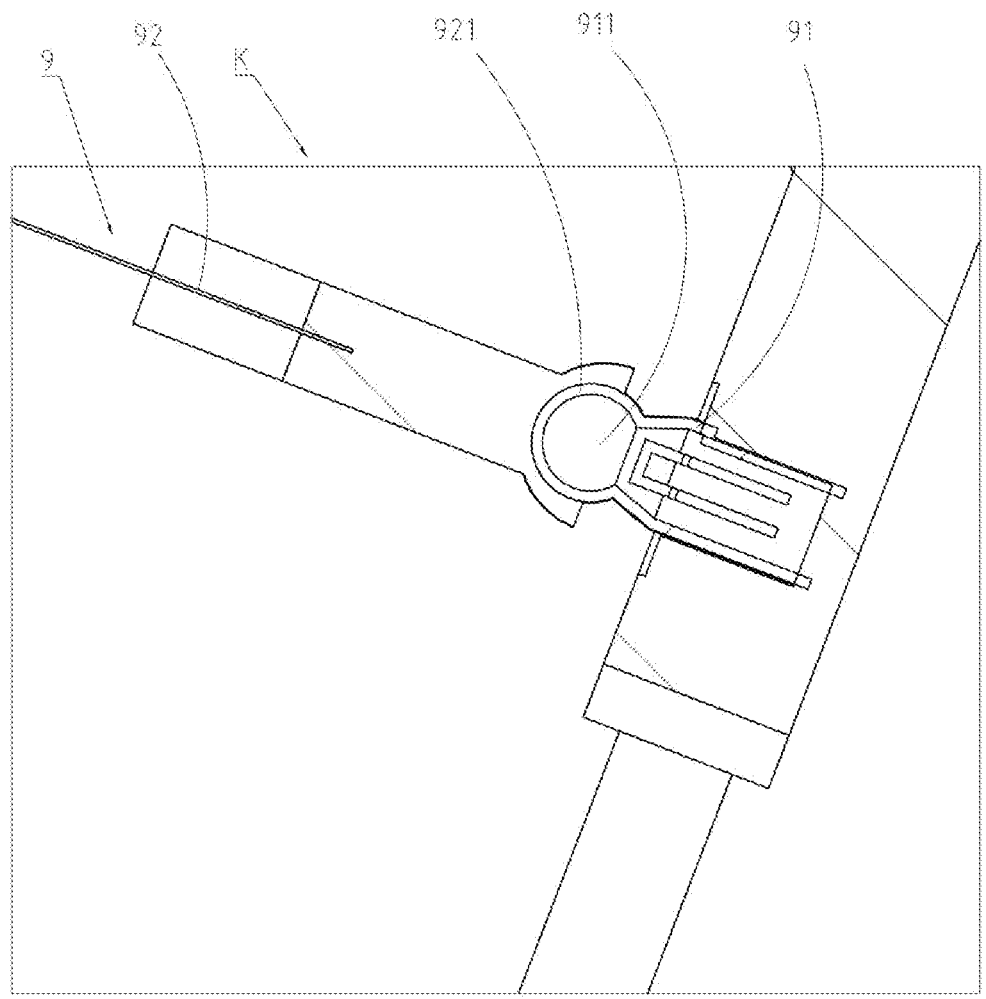
FIG. 18 is an enlarged view of the part K in FIG. 16.
Figure 19:
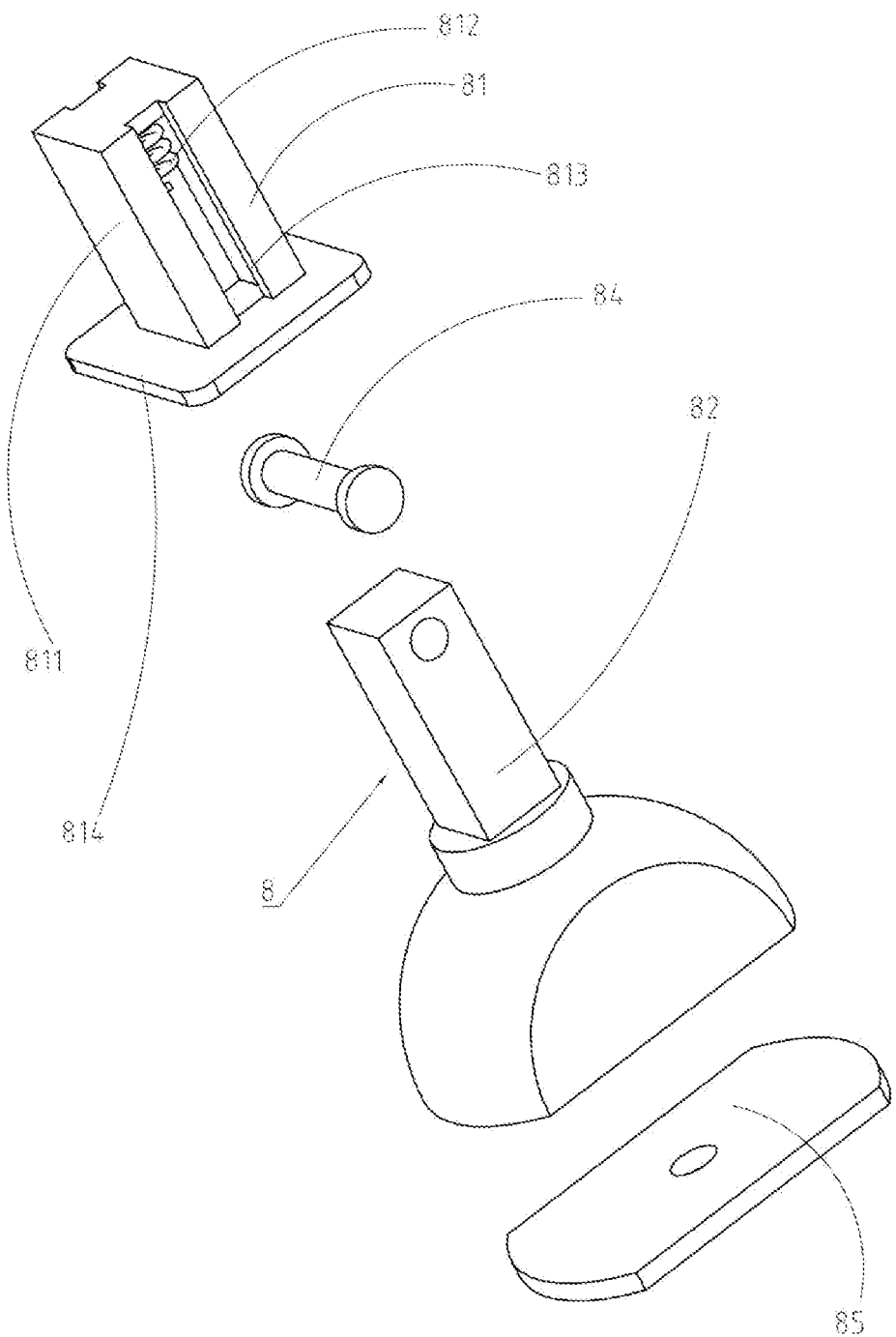
FIG. 19 is an exploded diagram of a braking assembly.

Referring to FIG. 1 to FIG. 19, a baby walker includes:
an upper housing 1;
a seat cushion 2, wherein the seat cushion 2 is connected to the upper housing 1;
a wheel assembly 3;
a lower housing 4, wherein the wheel assembly 3 is connected to the lower housing 4; and
a telescopic device 5, wherein one end of the telescopic device 5 is connected to the upper housing 1, and the other end of the telescopic device 5 is connected to the lower housing 4; a length of the telescopic device 5 can be adjusted telescopically between a contracted state and an extended state; and the telescopic device 5 is configured to adjust a distance between the upper housing 1 and the lower housing 4.

Through the above structure, the baby walker includes: an upper housing 1; a seat cushion 2, wherein the seat cushion 2 is connected to the upper housing 1; wheel assemblies 3; a lower housing 4, wherein the wheel assemblies 3 are connected to the lower housing 4; and telescopic devices 5, wherein one end of each telescopic device 5 is connected to the upper housing 1, and the other end of the telescopic device 5 is connected to the lower housing 4; a length of the telescopic device 5 can be adjusted telescopically between a contracted state and an extended state; and the telescopic device 5 is configured to adjust a distance between the upper housing 1 and the lower housing 4, so that a user can adjust the distance between the upper housing and the lower housing to adjust the height of the baby walker, and the baby walker can be used by babies with different heights, making the baby walker suitable for the entire growth process of the babies.

In this embodiment, each telescopic device 5 includes a telescopic assembly 51 and a first connecting rod 52; one end of the telescopic assembly 51 is connected to the lower housing 4, and the other end of the telescopic assembly 51 is connected to one end of the first connecting rod 52; and the other end of the first connecting rod 52 is connected to the upper housing 1. The telescopic assembly 51 includes a telescopic rod 511, a telescopic sleeve 512, and a first locking spring buckle 513; the telescopic sleeve 512 is provided with a first opening 5121; the telescopic rod 511 is plugged into the telescopic sleeve 512 through the first opening 5121; the telescopic rod 511 can slide in the telescopic sleeve 512; a side wall of the telescopic sleeve 512 is provided with several first adjustment holes 5122; the first locking spring buckle 513 is connected to the telescopic rod 511; and when the first locking spring buckle 513 slides along with the telescopic rod 511 to the first adjustment hole 5122, the first locking spring buckle 513 extends out via the first adjustment hole 5122 to lock the telescopic rod 511 to the telescopic sleeve 512, so as to fix the length of the telescopic device 5. Specifically, the first locking spring buckle 513 includes a first spring buckle head 5131, a first spring 5132, a first mounting bracket 5133, a pull wire 5134, and a push member 5135; the first mounting bracket 5133 is connected to the telescopic rod 511; the first spring buckle head 5131 is connected to the first mounting bracket 5133; one end of the first spring 5132 resists against the first spring buckle head 5131, and the other end of the first spring 5132 resists against the first mounting bracket 5133; the push member 5135 is connected to the telescopic rod 511; the telescopic rod 511 is provided with a first sliding chute 5111; the push member 5135 can slide in the first sliding chute

5111; one end of the pull wire 5134 is connected to the first spring buckle head 5131, and the other end of the pull wire 5134 is connected to the push member 5135; the push member 5135 includes a second mounting bracket 5136 and a first push button 5137; one end of the pull wire 5134 is connected to the first spring buckle head 5131, and the other end of the pull wire 5134 is connected to the second mounting bracket 5136; the second mounting bracket 5136 is arranged in the telescopic rod 511; the second mounting bracket 5136 is provided with a first insertion port 5138; the first push button 5137 is provided with an insertion block 5139; on an outer surface of the telescopic rod 511, the insertion block 5139 is inserted into the first insertion port 5138 through the first sliding chute 5111, so that the first push button 5137 slides on the first sliding chute 5111 and drives the second mounting bracket 5136, the pull wire 5134, and the first spring buckle head 5131 to move; when the first push button 5137 slides to a first position on the first sliding chute 5111 under the action of an external force, the first push button 5137 drives, through the second mounting bracket 5136 and the pull wire 5134, the first spring buckle head 5131 to contract until the first spring buckle head is separated from the first adjustment hole 5122, and the first spring 5132 is compressed; the telescopic rod 511 can slide in the telescopic sleeve 512; when the first push button 5137 is not subjected to an external force, an elastic reset force generated when the first spring 5132 is compressed can push the first spring 5132, the second mounting bracket 5136, and the first push button 5137 to be reset to a second position; and when the first spring buckle head 5131 slides with the telescopic rod 511 to the first adjustment hole 5122, the first spring 5132 can push the first spring buckle head 5131 to extend out via the first adjustment hole 5122 to lock the telescopic rod 511 to the telescopic sleeve 512, so as to fix the length of the telescopic device 5. Through the above structure, the arrangement of the telescopic device is effectively achieved. When the length of the telescopic device needs to be adjusted, the first push button 5137 can be pushed to the first position, so that the first push button 5137 can drive, through the second mounting bracket 5136 and the pull wire 5134, the first spring buckle head 5131 to contract until the first spring buckle head is separated from the first adjustment hole 5122, and the telescopic rod 511 can slide to extend and contract in the telescopic sleeve 512, so as to adjust the length of the telescopic assembly of the telescopic device. After the adjustment is completed, the first push button 5137 is released. The elastic reset force generated when the spring is compressed can push the first spring 5132, the second mounting bracket 5136, and the first push button 5137 to be reset to the second position. Furthermore, when the first spring buckle head 5131 slides with the telescopic rod 511 to the first adjustment hole 5122, the first spring 5132 can push the first spring buckle head 5131 to extend out via the first adjustment hole 5122, so as to lock the telescopic rod 511 to the telescopic sleeve 512 to fix the length of the telescopic device 5.

In this embodiment, the first connecting rod 52 is rotatably connected to the upper housing 1; the telescopic assembly 51 is rotatably connected to the lower housing 4; and the telescopic assembly 51 is rotatably connected to the first connecting rod 52, so that the telescopic assembly 51 and the first connecting rod 52 can rotate with each other to an unfolded position or a folded position. The baby walker further includes first locking devices 6; each first locking device 6 is connected to the first connecting rod 52 or the telescopic assembly 51; when the telescopic assembly 51 and the first connecting rod 52 rotate with each other to the unfolded position, the first locking device 6 locks the telescopic assembly 51 to the first connecting rod 52, so that the telescopic assembly 51 and the first connecting rod 52 do not rotate with each other; and when the first locking device 6 releases the locking between the telescopic assembly 51 and the first connecting rod 52, the telescopic assembly 51 and the first connecting rod 52 can rotate with each other to the folded position. Specifically, each first locking device 6 includes a first latch 61, a second spring 62, and a second insertion port 63 arranged on the first connecting rod 52; a second sliding chute 514 is arranged on the telescopic assembly 51; one end of the second spring 62 is connected to the telescopic assembly 51, and the other end of the second spring 62 is connected to the first latch 61; the first latch 61 can slide on the second sliding chute 514; when the telescopic assembly 51 and the first connecting rod 52 rotate with each other to the unfolded position, the second spring 62 can push the first latch 61 to slide on the second sliding chute 514 and into the second insertion port 63, so as to lock the telescopic assembly 51 to the first connecting rod 52, so that the telescopic assembly 51 and the first connecting rod 52 do not rotate with each other; the first latch 61 is arranged in the telescopic assembly 51; the first locking device 6 further includes a second push button 64; and on an outer surface of the telescopic assembly 51, the second push button 64 is connected to the first latch 61 through the second sliding chute 514. Further, the lower housing 4 is provided with a second opening 41; and when the telescopic device 5 is in the contracted state and the telescopic assembly 51 and the first connecting rod 52 rotate with each other to the folded position, a length of the telescopic assembly 51 and a length of the first connecting rod 52 are both less than an opening diameter of the second opening 41, and a length of the upper housing 1 and a width of the upper housing 1 are both less than the opening diameter of the second opening 41, so that the telescopic device 5 and the upper housing 1 can be folded from bottom to top in sequence and stored into the second opening 41. Through the above structure, when the user needs to use the baby walker, the first connecting rod and the telescopic assembly can rotate with each other to the unfolded position. The second spring 62 can push the first latch 61 to slide on the second sliding chute 514 and into the second insertion port 63, so as to lock the telescopic assembly 51 to the first connecting rod 52, so that the telescopic assembly 51 and the first connecting rod 52 do not rotate with each other to keep the baby stroller walker at the unfolded position for a baby. After use, the second push button 64 can be pushed to slide on the second sliding chute 514, so that the second push button 64 can drive the first latch 61 to slide in the telescopic assembly and on the second sliding chute, to drive the first latch 61 to be separated from the second insertion port 63; the locking between the first connecting rod and the telescopic assembly is released, and the first connecting rod and the telescopic assembly rotate with each other to the folded position; and the telescopic device 5 and the upper housing 1 can be folded from bottom to top in sequence and stored into the second opening 41. This reduces the volume of the baby walker and facilitating user storage and transportation of the baby walker.

In this embodiment, the seat cushion 2 is detachably connected to the upper housing 1. The baby walker further includes a second locking device 7. One end of the seat cushion 2 is detachably connected to the upper housing 1, and the other end of the seat cushion 2 is provided with several second adjustment holes 21 arranged in a longitudinal direction of the seat cushion; the second adjustment holes are configured to adjust a length of the seat cushion; the second locking device 7 is inserted into one of the several second adjustment holes 21; and the second locking device 7 is detachably connected to the upper housing 1. Specifically, there are four second adjustment holes 21, and the four second adjustment holes 21 are arranged in sequence in the longitudinal direction of the seat cushion. Specifically, the second locking device 7 includes a second latch 71, a second locking spring buckle 72, and a third insertion port 73 arranged on the upper housing 1; one end of the second latch 71 is provided with a first stop edge 711, and the other end of the second latch 71 is provided with a fourth insertion port 712; the other end of the second latch 71 is inserted into the third insertion port 73 and the second adjustment hole 21; the second locking spring buckle 72 is detachably connected to the fourth insertion port 712; and the first stop edge 711 and the second locking spring buckle 72 stop and lock the second latch 71 in the third insertion port 73, so as to lock the other end of the seat cushion 2 to the upper housing 1. Further, the second locking spring buckle 72 includes a first main body 721 and a second main body 722; the first main body 721 is provided with a first end 7211 and a second end 7212; a mounting opening 7213 is formed between the first end 7211 and the second end 7212; one end of the second main body 722 is rotatably connected to the first end 7211 of the first main body 721; a torsion spring 7214 is arranged on the first main body 721 or the second main body 722; and the torsion spring 7214 is configured to push the other end of the second main body 722 to compress the second end 7212 of the first main body 721, so as to close the mounting opening 7213. Through the above structure, the user can adjust the height of the seat cushion through the second locking device 7 and the several second adjustment holes 21, so that the seat cushion of the baby walker can be used by babies with different heights, making the baby walker suitable for the entire growth process of the babies. Further, when the user needs to adjust the height of the seat cushion, the user can press the second main body 722 to separate the other end of the second main body 722 from the second end 7212 of the first main body 721 and open the mounting opening 7213, so that the second locking spring buckle 72 can be separated from the fourth insertion port 712 through the mounting opening 7213 to release the stop performed by the second locking spring buckle 72 on the second latch 71; it is convenient to remove the second latch 71 from the third insertion port 73 and one of the second adjustment holes 21 and to insert the other end of the second latch 71 into the third insertion port 73 and another second adjustment hole 21 to complete the adjustment of the height of the seat cushion. After adjustment, the second main body 722 can be pressed to open the mounting opening 7213, and the torsion spring 7214 is compressed. The second locking spring buckle 72 is inserted into the fourth insertion port 712 through the mounting opening 7213, and the elastic reset force generated when the torsion spring 7214 is compressed can push the second main body 722 to compress the first main body 721 to close the mounting opening 7213. The second locking spring buckle 72 is connected to the fourth insertion port 712, so as to enable the first stop edge 711 and the second locking spring buckle 72 to stop and lock the second latch 71 in the third insertion port 73, thus locking the other end of the seat cushion 2 to the upper housing 1.

In this embodiment, the baby walker further includes a braking assembly 8 and a third locking device 81; the braking assembly 8 is rotatably connected to the lower housing 4; the third locking device 81 is connected to the braking assembly 8 to lock the braking assembly 8 to the lower housing 4; and when the third locking device 81 unlocks the braking assembly 8, the braking assembly 8 can rotate relative to the lower housing 4 to allow the braking assembly 8 to rotate between an initial position and a braking position. The braking assembly 8 includes a brake rod 82, a third mounting bracket 83, and a rotating shaft 84; the third mounting bracket 83 is connected to the lower housing 4; the brake rod 82 is rotatably connected to the third mounting bracket 83 through the rotating shaft 84, so that the brake rod 82 can rotate between the initial position and the braking position; the third locking device 81 includes a locking housing 811 and a third spring 812; the locking housing 811 is provided with a third sliding chute 813; the rotating shaft 84 can slide on the third sliding chute 813; the locking housing 811 sleeves the brake rod 82; one end of the third spring 812 resists against an inner wall of the third sliding chute 813, and the other end of the third spring 812 resists against the rotating shaft 84; the locking housing 811 is provided with a second stop edge 814; when the locking housing 811 rotates with the brake rod 82 to the initial position, the third spring 812 pushes the second stop edge 814 to be locked to the third mounting bracket 83; the third mounting bracket 83 is further provided with a fifth insertion port 831; when the locking housing 811 rotates with the brake rod 82 to the braking position, the third spring 812 pushes the locking housing 811 to be locked in the fifth insertion port 831; the baby walker further includes a flexible brake pad 85; the brake pad 85 is detachably connected to the brake rod 82; and a surface of the brake pad 85 is provided with several antiskid lines 851. Through the above structure, when the user needs to brake the baby walker to prevent the baby walker from moving, the user can apply an external force to the second stop edge 814 to overcome a push force of the third spring 812, so that the second stop edge 814 can be separated from the third mounting bracket 83, and the brake rod 82 can rotate. When the locking housing 811 rotates with the brake rod 82 to the braking position, the third spring 812 will push the locking housing 811 to be locked in the fifth insertion port 831, so as to fix the brake rod 82 at the braking position. When the brake rod 82 is fixed at the braking position, the wheel assembly can be lifted off the ground. The antiskid lines 851 of the brake pad 85 prevent the baby stroller walker from moving. When the user needs to move the baby walker through the wheel assembly, the user can apply an external force to the locking housing 811 to overcome the push force of the third spring 812 to separate the locking housing 811 from the fifth insertion port 831, so that the brake rod 82 can rotate. When the locking housing 811 rotates with the brake rod 82 to the initial position, the third spring 812 will push the second stop edge 814 to be locked to the third mounting bracket 83, so that the brake rod 82 is fixed at the initial position, and wheels can be in contact with the ground and move on the ground.

In this embodiment, the baby walker further includes a handle 86. The handle 86 is detachably connected to the upper housing 1. The handle 86 further includes a third locking spring buckle 87. The upper housing 1 is provided with a sixth insertion port 11. A side wall of the sixth insertion port 11 is provided with a locking hole position 111. When the handle 86 is inserted into the sixth insertion port 11, the third locking spring buckle 87 extends out of the locking hole position 111 to lock the handle 86 to the upper housing 1. The third locking spring buckle 87 includes a fourth spring 871 and a second spring buckle head 872. One end of the fourth spring 871 is connected to the handle 86, and the other end of the fourth spring 871 is connected to the second spring buckle head 872. When the handle 86 is inserted into the sixth insertion port 11, the fourth spring 871 pushes the second spring buckle head 872 to extend out of the locking hole position 111 to lock the handle 86 to the upper housing 1. Through the above structure, the detachable connection between the handle 86 and the upper housing can be achieved through the third locking spring buckle 87, making it convenient for the user to replace handles 86 with different lengths.

Specifically, the baby walker further includes a sunshade 9; the sunshade 9 includes a second connecting rod 91 and a shading plate 92; one end of the second connecting rod 91 is detachably connected to the handle 86, and the other end of the second connecting rod 91 is provided with a universal ball head 911; the shading plate 92 is provided with a universal ball groove 921; the universal ball head 911 is connected to the universal ball groove 921; and the universal ball head 911 can rotate in the universal ball groove 921, so that the shading plate 92 and the second connecting rod 91 can rotate relatively. Through the above structure, the shading plate 92 can be rotated through the universal ball head 911 and the universal ball groove 921, so as to adjust an angle of the shading plate 92 and make the shading plate 92 better block away the sunlight.

In this embodiment, the baby walker further includes a music box 93. The music box 93 is detachably connected to the upper housing 1. Specifically, the baby walker further includes a knob 94; the knob 94 is rotatably connected to the upper housing 1; the knob 94 is provided with a clamping block 941; the upper housing 1 is provided with a music box mounting slot 12; the music box 93 is provided with a clamping slot 931; and when the music box 93 is mounted in the music box mounting slot 12, the clamping block 941 can rotate with the knob 94 into the clamping slot 931, so as to stop and lock the music box 93 in the music box mounting slot 12. Through the above structure, the mounting of the music box 93 is effectively achieved, making it convenient for the user to mount, remove, replace, and clean the music box 93.

In this embodiment, the baby walker further includes a foot mat 95. The foot mat 95 is detachably connected to the lower housing 4. The foot mat 95 includes a flexible mat body 951 and a flexible strap 952; one end of the strap 952 is connected to the foot mat 95, and one end of the strap 952 is provided with a first clamping portion 9521; the other end of the strap 952 is provided with a first clamping fitting portion 9522; the lower housing 4 is provided with a fifth insertion port 831; and the first clamping fitting portion 9522 is detachably connected to the first clamping portion 9521 through the fifth insertion port 831 to connect the mat body 951 to the lower housing 4. Through the above structure, due to the detachable connection between the foot mat 95 and the lower housing, when a baby needs to learn to walk using the baby walker, the foot mat 95 can be removed, making it convenient for the feet of the baby to touch the ground to learn to walk. When the baby needs to ride in the baby stroller, the foot mat 95 can be connected to the lower housing to prevent the feet of the baby from directly touching the ground. This improves the comfort and safety of riding of the baby.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A baby walker, comprising:
an upper housing;
a seat cushion, wherein the seat cushion is connected to the upper housing;
a wheel assembly;
a lower housing, wherein the wheel assembly is connected to the lower housing; and
a telescopic device, wherein one end of the telescopic device is connected to the upper housing, and the other end of the telescopic device is connected to the lower housing; a length of the telescopic device is adjusted telescopically between a contracted state and an extended state; and the telescopic device is configured to adjust a distance between the upper housing and the lower housing,
wherein the telescopic device comprises a telescopic assembly and a first connecting rod; one end of the telescopic assembly is connected to the lower housing, and the other end of the telescopic assembly is connected to one end of the first connecting rod; and the other end of the first connecting rod is connected to the upper housing,
wherein the first connecting rod is rotatably connected to the upper housing; the telescopic assembly is rotatably connected to the lower housing; and the telescopic assembly is rotatably connected to the first connecting rod, so that the telescopic assembly and the first connecting rod rotate with each other to an unfolded position or a folded position,
wherein the lower housing is provided with a first opening; and when the telescopic device is in the contracted state and the telescopic assembly and the first connecting rod rotate with each other to the folded position, a length of the telescopic assembly and a length of the first connecting rod are both less than an opening diameter of the first opening, and a length of the upper housing and a width of the upper housing are both less than the opening diameter of the first opening, so that the telescopic device and the upper housing are folded from bottom to top in sequence and stored into the first opening.

2. The baby walker according to claim 1, wherein the telescopic assembly comprises a telescopic rod, a telescopic sleeve, and a first locking spring buckle; the telescopic sleeve is provided with a second opening; the telescopic rod is plugged into the telescopic sleeve through the second opening; the telescopic rod slides in the telescopic sleeve; a side wall of the telescopic sleeve is provided with several first adjustment holes; the first locking spring buckle is connected to the telescopic rod; and when the first locking spring buckle slides along with the telescopic rod to the first adjustment hole, the first locking spring buckle extends out via the first adjustment hole to lock the telescopic rod to the telescopic sleeve, so as to fix the length of the telescopic device.

3. The baby walker according to claim 2, wherein the first locking spring buckle comprises a first spring buckle head, a first spring, a first mounting bracket, a pull wire, and a push member; the first mounting bracket is connected to the telescopic rod; the first spring buckle head is connected to the first mounting bracket; one end of the first spring resists against the first spring buckle head, and the other end of the first spring resists against the first mounting bracket; the push member is connected to the telescopic rod; the telescopic rod is provided with a first sliding chute; the push member slides in the first sliding chute; one end of the pull wire is connected to the first spring buckle head, and the other end of the pull wire is connected to the push member; the push member comprises a second mounting bracket and a first push button; one end of the pull wire is connected to the first spring buckle head, and the other end of the pull wire is connected to the second mounting bracket; the second mounting bracket is located in the telescopic rod; the second mounting bracket is provided with a first insertion port; the first push button is provided with an insertion block; on an outer surface of the telescopic rod, the insertion block is inserted into the first insertion port through the first sliding chute, so that the first push button slides on the first sliding chute and drives the second mounting bracket, the pull wire, and the first spring buckle head to move; when the first push button slides to a first position on the first sliding chute under the action of an external force, the first push button drives, through the second mounting bracket and the pull wire, the first spring buckle head to contract until the first spring buckle head is separated from the first adjustment hole, and the first spring is compressed; the telescopic rod slides in the telescopic sleeve; when the first push button is not subjected to an external force, an elastic reset force generated when the first spring is compressed pushes the first spring, the second mounting bracket, and the first push button to be reset to a second position; and when the first spring buckle head slides with the telescopic rod to the first adjustment hole, the first spring pushes the first spring buckle head to extend out via the first adjustment hole to lock the telescopic rod to the telescopic sleeve, so as to fix the length of the telescopic device.

4. The baby walker according to claim 1, further comprising a first locking device, wherein the first locking device is connected to the first connecting rod or the telescopic assembly; when the telescopic assembly and the first connecting rod rotate with each other to the unfolded position, the first locking device locks the telescopic assembly to the first connecting rod, so that the telescopic assembly and the first connecting rod do not rotate with each other; and when the first locking device releases the locking between the telescopic assembly and the first connecting rod, the telescopic assembly and the first connecting rod rotate with each other to the folded position.

5. The baby walker according to claim 4, wherein the first locking device comprises a first latch, a second spring, and a second insertion port arranged on the telescopic assembly; a second sliding chute is arranged on the first connecting rod; one end of the second spring is connected to the first connecting rod, and the other end of the second spring is connected to the first latch; the first latch slides on the second sliding chute; when the telescopic assembly and the first connecting rod rotate with each other to the unfolded position, the second spring pushes the first latch to slide on the second sliding chute and into the second insertion port, so as to lock the telescopic assembly to the first connecting rod, so that the telescopic assembly and the first connecting rod do not rotate with each other; the first latch is arranged in the telescopic assembly; the first locking device further comprises a second push button; and the second push button is connected to the first latch through an outer surface of the first connecting rod and the second sliding chute.

6. The baby walker according to claim 1, wherein the seat cushion is detachably connected to the upper housing.

7. The baby walker according to claim 4, further comprising a locking device, wherein one end of the seat cushion is detachably connected to the upper housing, and the other end of the seat cushion is provided with several second adjustment holes arranged in a longitudinal direction of the seat cushion; the second adjustment holes are configured to adjust a length of the seat cushion; the locking device is inserted into one of the several second adjustment holes; and the locking device is detachably connected to the upper housing.

8. A baby walker, comprising:
an upper housing;
a seat cushion, wherein the seat cushion is detachably connected to the upper housing;
a wheel assembly;
a lower housing, wherein the wheel assembly is connected to the lower housing;
a telescopic device, wherein one end of the telescopic device is connected to the upper housing, and the other end of the telescopic device is connected to the lower housing; a length of the telescopic device is adjusted telescopically between a contracted state and an extended state; and the telescopic device is configured to adjust a distance between the upper housing and the lower housing; and
a locking device, wherein one end of the seat cushion is detachably connected to the upper housing, and the other end of the seat cushion is provided with several adjustment holes arranged in a longitudinal direction of the seat cushion; the adjustment holes are configured to adjust a length of the seat cushion; the locking device is inserted into one of the several adjustment holes; and the locking device is detachably connected to the upper housing,
wherein the locking device comprises a latch, a locking spring buckle, and a first insertion port arranged on the upper housing; one end of the latch is provided with a first stop edge, and the other end of the latch is provided with a second insertion port; the other end of the latch is inserted into the first insertion port and the adjustment hole; the locking spring buckle is detachably connected to the second insertion port; and the first stop edge and the locking spring buckle stop and lock the latch in the first insertion port, so as to lock the other end of the seat cushion to the upper housing.

9. The baby walker according to claim 8, wherein the locking spring buckle comprises a first main body and a second main body; the first main body is provided with a first end and a second end; a mounting opening is formed between the first end and the second end; one end of the second main body is rotatably connected to the first end of the first main body; a torsion spring is arranged on the first main body or the second main body; and the torsion spring is configured to push the other end of the second main body to compress the second end of the first main body, so as to close the mounting opening.

10. The baby walker according to claim 1, further comprising a braking assembly and a locking device, wherein the braking assembly is rotatably connected to the lower housing; the locking device is connected to the braking assembly to lock the braking assembly to the lower housing; and when the locking device unlocks the braking assembly, the braking assembly rotates relative to the lower housing to allow the braking assembly to rotate between an initial position and a braking position.

11. A baby walker, comprising:

an upper housing;

a seat cushion, wherein the seat cushion is detachably connected to the upper housing;

a wheel assembly;

a lower housing, wherein the wheel assembly is connected to the lower housing;

a telescopic device, wherein one end of the telescopic device is connected to the upper housing, and the other end of the telescopic device is connected to the lower housing; a length of the telescopic device is adjusted telescopically between a contracted state and an extended state; and the telescopic device is configured to adjust a distance between the upper housing and the lower housing; and a braking assembly and a locking device, wherein the braking assembly is rotatably connected to the lower housing; the locking device is connected to the braking assembly to lock the braking assembly to the lower housing; and when the locking device unlocks the braking assembly, the braking assembly rotates relative to the lower housing to allow the braking assembly to rotate between an initial position and a braking position, wherein the braking assembly comprises a brake rod, a mounting bracket, and a rotating shaft; the mounting bracket is connected to the lower housing; the brake rod is rotatably connected to the mounting bracket through the rotating shaft, so that the brake rod rotates between the initial position and the braking position; the locking device comprises a locking housing and a spring; the locking housing is provided with a sliding chute; the rotating shaft slides on the sliding chute; the locking housing sleeves the brake rod; one end of the spring resists against an inner wall of the sliding chute, and the other end of the spring resists against the rotating shaft; the locking housing is provided with a second stop edge; when the locking housing rotates with the brake rod to the initial position, the spring pushes the second stop edge to be locked to the mounting bracket; the mounting bracket is further provided with an insertion port; when the locking housing rotates with the brake rod to the braking position, the spring pushes the locking housing to be locked in the insertion port; the baby stroller further comprises a flexible brake pad; the brake pad is detachably connected to the brake rod; and a surface of the brake pad is provided with several antiskid lines.

12. The baby walker according to claim 1, further comprising a handle, wherein the handle is detachably connected to the upper housing.

13. The baby walker according to claim 12, further comprising a sunshade, wherein the sunshade comprises a second connecting rod and a shading plate; one end of the second connecting rod is detachably connected to the handle, and the other end of the second connecting rod is provided with a universal ball head; the shading plate is provided with a universal ball groove; the universal ball head is connected to the universal ball groove; and the universal ball head rotates in the universal ball groove, so that the shading plate and the second connecting rod rotate relatively.

14. The baby walker according to claim 1, further comprising a music box, wherein the music box is detachably connected to the upper housing.

15. The baby walker according to claim 14, further comprising a knob, wherein the knob is rotatably connected to the upper housing; the knob is provided with a clamping block; the upper housing is provided with a music box mounting slot; the music box is provided with a clamping slot; and when the music box is mounted in the music box mounting slot, the clamping block rotates with the knob into the clamping slot, so as to stop and lock the music box in the music box mounting slot.

16. The baby walker according to claim 1, further comprising a foot mat, wherein the foot mat is detachably connected to the lower housing.

17. The baby walker according to claim 16, wherein the foot mat comprises a flexible mat body and a flexible strap; one end of the strap is connected to the foot mat, and one end of the strap is provided with a first clamping portion; the other end of the strap is provided with a first clamping fitting portion; the lower housing is provided with a insertion port; and the first clamping fitting portion is detachably connected to the first clamping portion through the insertion port to connect the mat body to the lower housing.

\* \* \* \* \*